US012772235B2

(12) United States Patent
Khan Beigi et al.

(10) Patent No.: US 12,772,235 B2
(45) Date of Patent: Oct. 20, 2026

(54) PUCCH-RELATED LATENCY AND COVERAGE ENHANCEMENT FOR SUBBAND NON-OVERLAPPING FULL DUPLEX

(71) Applicant: InterDigital Patent Holdings, Inc., Wilmington, DE (US)

(72) Inventors: Nazli Khan Beigi, Longueuil (CA); Jonghyun Park, Syosset, NY (US); Paul Marinier, Brossard (CA); Moon Il Lee, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 266 days.

(21) Appl. No.: 18/473,554

(22) Filed: Sep. 25, 2023

(65) Prior Publication Data

US 2024/0107525 A1 Mar. 28, 2024

Related U.S. Application Data

(60) Provisional application No. 63/410,949, filed on Sep. 28, 2022.

(51) Int. Cl.
*H04W 72/23* (2023.01)
*H04L 1/1812* (2023.01)
(Continued)

(52) U.S. Cl.
CPC ....... *H04W 72/1268* (2013.01); *H04L 1/1812* (2013.01); *H04L 5/14* (2013.01); *H04W 72/0453* (2013.01); *H04W 72/232* (2023.01)

(58) Field of Classification Search
None
See application file for complete search history.

(56) References Cited

U.S. PATENT DOCUMENTS

2021/0045105 A1* 2/2021 Yoon ..................... H04W 72/21
2021/0211241 A1* 7/2021 Xiong ................... H04L 1/1819
(Continued)

OTHER PUBLICATIONS

Third Generation Partnership Project (3GPP), “Discussion on Sub-band Non-Overlapping Full Duplex for NR”, MediaTek Inc., R1-2206984, Aug. 22-26, 2022, 10 pages.
(Continued)

*Primary Examiner* — Sai Aung
(74) *Attorney, Agent, or Firm* — Flaster Greenberg, P.C.

(57) ABSTRACT

A wireless transmit receive unit (WTRU) may receive physical uplink control channel (PUCCH) configuration information, SBFD configuration information, and DCI comprising a first PRI. The WTRU may determine that a PUCCH transmission is to be sent. The WTRU may determine, based on a first rule of interpreting the first PRI and the PUCCH configuration information, that a first PUCCH resource indicated by the first PRI is included in at least one frequency resource that is at least partially included in at least one subband for uplink (UL) transmission and one subband for downlink reception indicated by the SBFD configuration information. The WTRU may determine a second PUCCH resource, which may be determined based on a second rule for interpreting the first PRI and the PUCCH configuration information. The second PUCCH
(Continued)

resource may be within subbands for UL transmission. The WTRU may transmit the PUCCH transmission using the second frequency resource.

18 Claims, 9 Drawing Sheets

(51) Int. Cl.

| | |
|---|---|
| ***H04L 5/14*** | (2006.01) |
| ***H04W 72/0446*** | (2023.01) |
| ***H04W 72/0453*** | (2023.01) |
| ***H04W 72/1268*** | (2023.01) |
| ***H04W 72/21*** | (2023.01) |
| ***H04W 72/232*** | (2023.01) |

(56) References Cited

U.S. PATENT DOCUMENTS

| | | | | |
|---|---|---|---|---|
| 2021/0392666 | A1* | 12/2021 | Huang | H04W 72/23 |
| 2022/0248395 | A1* | 8/2022 | Andersson | H04W 72/0446 |
| 2024/0072972 | A1* | 2/2024 | Taherzadeh Boroujeni | H04L 5/0007 |
| 2024/0313907 | A1* | 9/2024 | Lee | H04L 1/1671 |
| 2024/0322980 | A1* | 9/2024 | Lee | H04W 72/21 |
| 2024/0372661 | A1* | 11/2024 | Park | H04L 5/0044 |
| 2025/0151046 | A1* | 5/2025 | Ma | H04W 72/1273 |
| 2025/0193865 | A1* | 6/2025 | Zhang | H04W 72/231 |

OTHER PUBLICATIONS

Third Generation Partnership Project (3GPP), "Summary #1 of Subband Non-Overlapping Full Duplex", Moderator (CATT), R1-2207805, Aug. 22-26, 2022, 70 pages.

Third Generation Partnership Project (3GPP), "Radio Resource Control (RRC) protocol specification" (Release 16), 3GPP TS 38.331 V16.7.0, Valbonne, France, Dec. 2021, 963 pages.

Third Generation Partnership Project (3GPP), "Physical channels and modulation", (Release 17), 3GPP TS 38.211 V17.0.0, Valbonne, France, Dec. 2021, 134 pages.

Third Generation Partnership Project (3GPP), "Multiplexing and channel coding", (Release 17), 3GPP TS 38.212 V17.0.0, Valbonne, France, Dec. 2021, 190 pages.

Third Generation Partnership Project (3GPP), "Physical layer procedures for control", (Release 17), 3GPP TS 38.213 V17.0.0, Valbonne, France, Dec. 2021, 225 pages.

Third Generation Partnership Project (3GPP), "Physical layer procedures for data", (Release 17), 3GPP TS 38.214 V17.0.0, Valbonne, France, Dec. 2021, 217 pages.

Third Generation Partnership Project (3GPP), "New WID: MIMO Evolution for Downlink and Uplink", Samsung, 3GPP TSG RAN Meeting #94e, Electronic Meeting, Dec. 2021, RP-213598, 6 pages.

Third Generation Partnership Project (3GPP), "Medium Access Control (MAC) protocol specification", (Release 16), 3GPP TS 38.321 V16.7.0, Valbonne, France, Dec. 2021, 158 pages.

* cited by examiner

```
PUCCH-format3 : : =                      SEQUENCE {
        nrofPRBs                             INTEGER (1..16),
        nrofSymbols                          INTEGER (4..14),
        nrofPRBs                             INTEGER (0..10),
}

PUCCH-format4 : : =                      SEQUENCE {
        nrofSymbols                          INTEGER (4..14),
        occ-Length                           INTEGER {n2, n4},
        occ-Index                            INTEGER {n0, n1, n2, n3},
        startingSymbolIndex                  INTEGER (0..10),
}
```

FIG. 4

PUCCH-RELATED LATENCY AND COVERAGE ENHANCEMENT FOR SUBBAND NON-OVERLAPPING FULL DUPLEX

CROSS REFERENCE TO RELATED APPLICATIONS

This application claims the benefit of U.S. Provisional Application No. 63/410,949 filed Sep. 28, 2022. The entire contents of which are herein incorporated by reference in their entirety.

BACKGROUND

This disclosure pertains to devices, methods, and systems for latency and coverage enhancement for subband non-overlapping full duplex (SBFD).

SUMMARY

A WTRU may receive physical uplink control channel (PUCCH) configuration information. The WTRU may receive SBFD configuration information. The SBFD configuration information may indicate one or more orthogonal frequency division multiplexing (OFDM) symbols that are associated with one or more subbands for uplink transmission and one or more subbands for downlink reception. The WTRU may receive DCI comprising a first PRI. The WTRU may determine that a PUCCH transmission indicated by the DCI is to be sent using at least one or more OFDM symbols that are associated with a set of one or more subbands for uplink transmission and a set of one or more subbands for downlink reception indicated by SBFD configuration information. The WTRU may determine, based on a first rule of interpreting the first PRI and the PUCCH configuration information, that a first PUCCH resource indicated by the first PRI is included in at least one frequency resource that is at least partially included in at least one subband of the set of one or more subbands for uplink transmission and/or one subband of the set of one or more subbands for downlink reception indicated by the SBFD configuration information. The WTRU may determine a second PUCCH resource in response to the determination that the first PUCCH resource indicated by the first PRI is included in at least one frequency resource that is at least partially included in at least one subband of the set of one or more subbands for uplink transmission and/or one subband of the set of one or more subbands for downlink reception indicated by the SBFD configuration information. The second PUCCH resource may be determined based on a second rule for interpreting the first PRI and the PUCCH configuration information. The second PUCCH resource may be within the set of one or more subbands for uplink transmission indicated by the SBFD configuration information. The WTRU may transmit the PUCCH transmission using the second frequency resource.

The second rule may comprise applying a frequency offset to the first PUCCH resource. The second rule may comprise applying a different mapping for the first PRI to PUCCH resources for transmissions associated with the SFBD configuration information and the first PRI. The second rule may map the first PRI to a second PRI. The second PRI may be used for determining the second PUCCH resource. The second PRI may be used for SBFD uplink transmissions based on an association with non-SBFD PRIs.

The second PUCCH resource may be in slot symbols. The PUCCH configuration information may comprise a number of transmission repetitions. The PUCCH may be transmitted using a frequency domain resource allocation (FDRA). The DCI may indicate that the first PRI is for HARQ-ACK transmission. Determining the second PUCCH resource may comprise re-indexing PUCCH resources. Transmitting the PUCCH transmission may be in time units configured for SBFD.

BRIEF DESCRIPTION OF THE DRAWINGS

A more detailed understanding may be had from the following description, given by way of example in conjunction with the accompanying drawings, in which like reference numerals in the figures indicate like elements, and in which:

FIG. 4 illustrates an example of PUCCH formats 3 and 4;

DETAILED DESCRIPTION

Figure 1A:
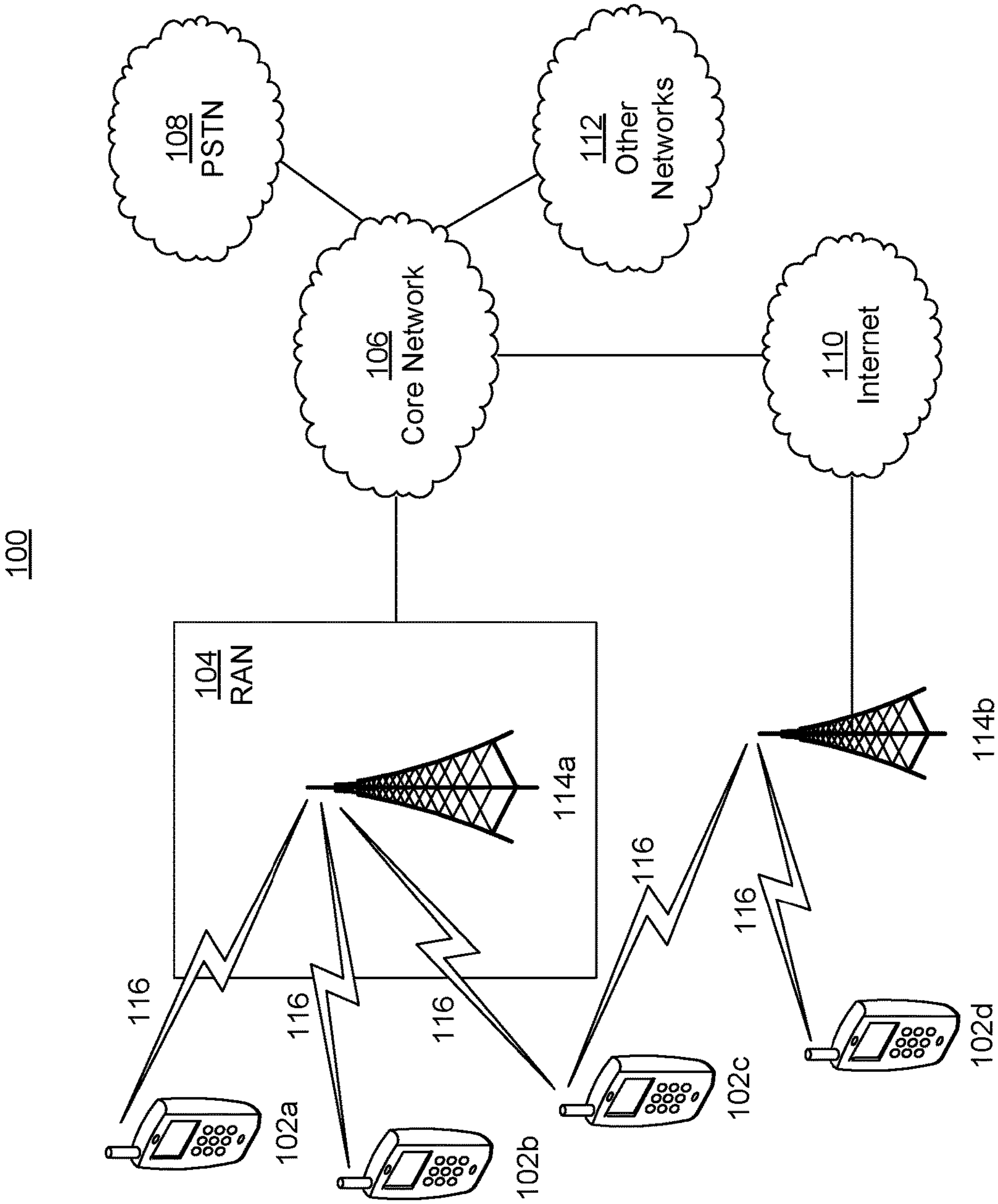
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements.

Each of the WTRUs 102_a_, 102_b_, 102_c_, 102_d_ may be any type of device configured to operate and/or communicate in a wireless environment. By way of example, the WTRUs 102_a_, 102_b_, 102_c_, 102_d_, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102_a_, 102_b_, 102_c_ and 102_d_ may be interchangeably referred to as a WTRU.

The communications systems 100 may also include a base station 114_a_ and/or a base station 114_b_. Each of the base stations 114_a_, 114_b_ may be any type of device configured to wirelessly interface with at least one of the WTRUs 102_a_, 102_b_, 102_c_, 102_d_ to facilitate access to one or more communication networks, such as the CN 106/115, the Internet 110, and/or the other networks 112. By way of example, the base stations 114_a_, 114_b_ may be a base transceiver station (BTS), a Node-B, an eNode B, a Home Node B, a Home eNode B, a gNB, a NR NodeB, a site controller, an access point (AP), a wireless router, and the like. While the base stations 114_a_, 114_b_ are each depicted as a single element, it will be appreciated that the base stations 114_a_, 114_b_ may include any number of interconnected base stations and/or network elements.

The base station 114_a_ may be part of the RAN 104/113, which may also include other base stations and/or network elements (not shown), such as a base station controller (BSC), a radio network controller (RNC), relay nodes, etc. The base station 114_a_ and/or the base station 114_b_ may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114_a_ may be divided into three sectors. Thus, in one embodiment, the base station 114_a_ may include three transceivers, i.e., one for each sector of the cell. In an embodiment, the base station 114_a_ may employ multiple-input multiple output (MIMO) technology and may utilize multiple transceivers for each sector of the cell. For example, beamforming may be used to transmit and/or receive signals in desired spatial directions.

The base stations 114_a_, 114_b_ may communicate with one or more of the WTRUs 102_a_, 102_b_, 102_c_, 102_d_ over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114_a_ in the RAN 104/113 and the WTRUs 102_a_, 102_b_, 102_c_ may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114_a_ and the WTRUs 102_a_, 102_b_, 102_c_ may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114_a_ and the WTRUs 102_a_, 102_b_, 102_c_ may implement a radio technology such as NR Radio Access, which may establish the air interface 116 using New Radio (NR).

In an embodiment, the base station 114_a_ and the WTRUs 102_a_, 102_b_, 102_c_ may implement multiple radio access technologies. For example, the base station 114_a_ and the WTRUs 102_a_, 102_b_, 102_c_ may implement LTE radio access and NR radio access together, for instance using dual connectivity (DC) principles. Thus, the air interface utilized by WTRUs 102_a_, 102_b_, 102_c_ may be characterized by multiple types of radio access technologies and/or transmissions sent to/from multiple types of base stations (e.g., a eNB and a gNB).

In other embodiments, the base station 114_a_ and the WTRUs 102_a_, 102_b_, 102_c_ may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114_b_ in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114_b_ and the WTRUs 102_c_, 102_d_ may implement a radio technology such as IEEE 802.11 to establish a wireless local area network (WLAN). In an embodiment, the base station 114_b_ and the WTRUs 102_c_, 102_d_ may implement a radio technology such as IEEE 802.15 to establish a wireless personal area network (WPAN). In yet another embodiment, the base station 114_b_ and the WTRUs 102_c_, 102_d_ may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114_b_ may have a direct connection to the Internet 110. Thus, the base station 114_b_ may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102_a_, 102_b_, 102_c_, 102_d_. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
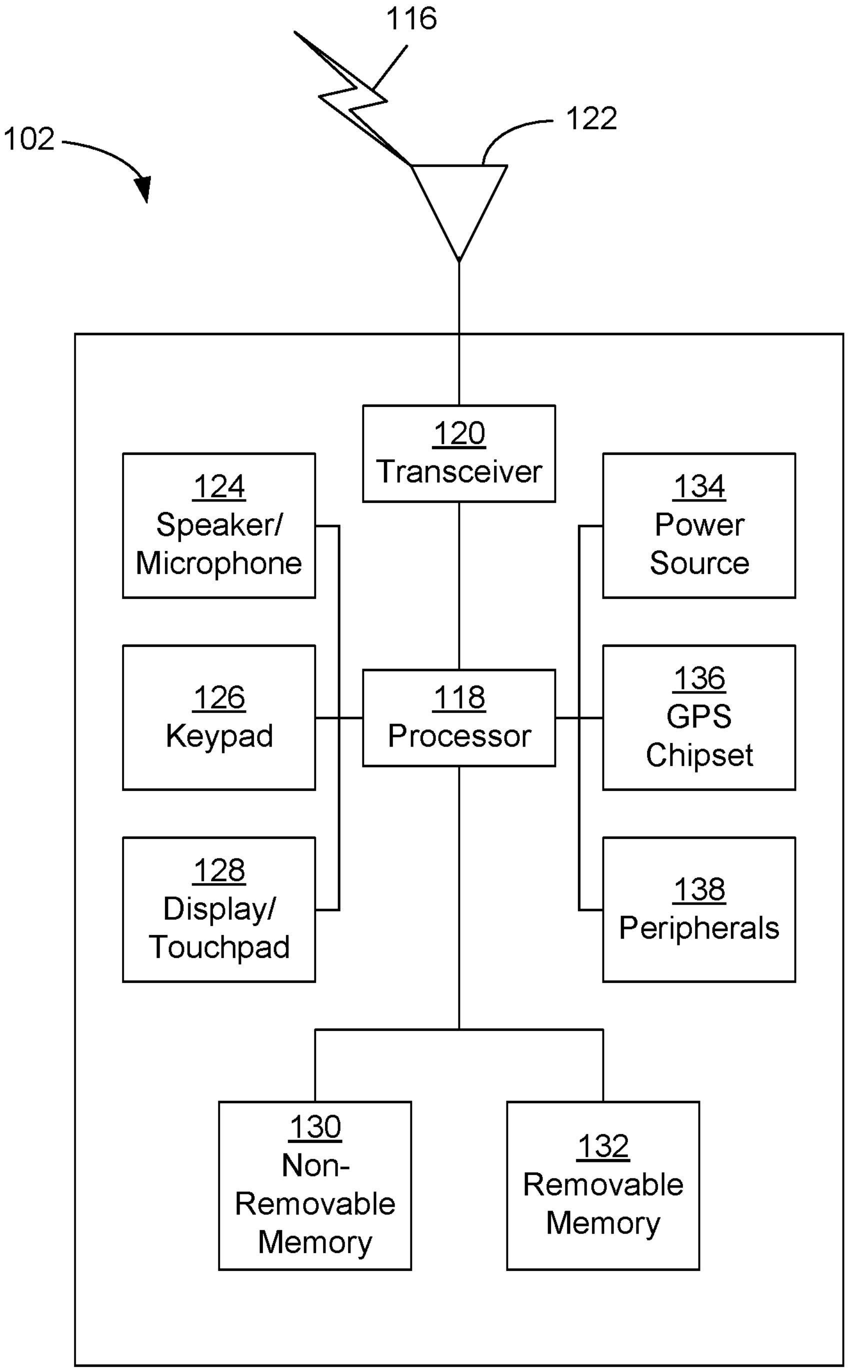
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
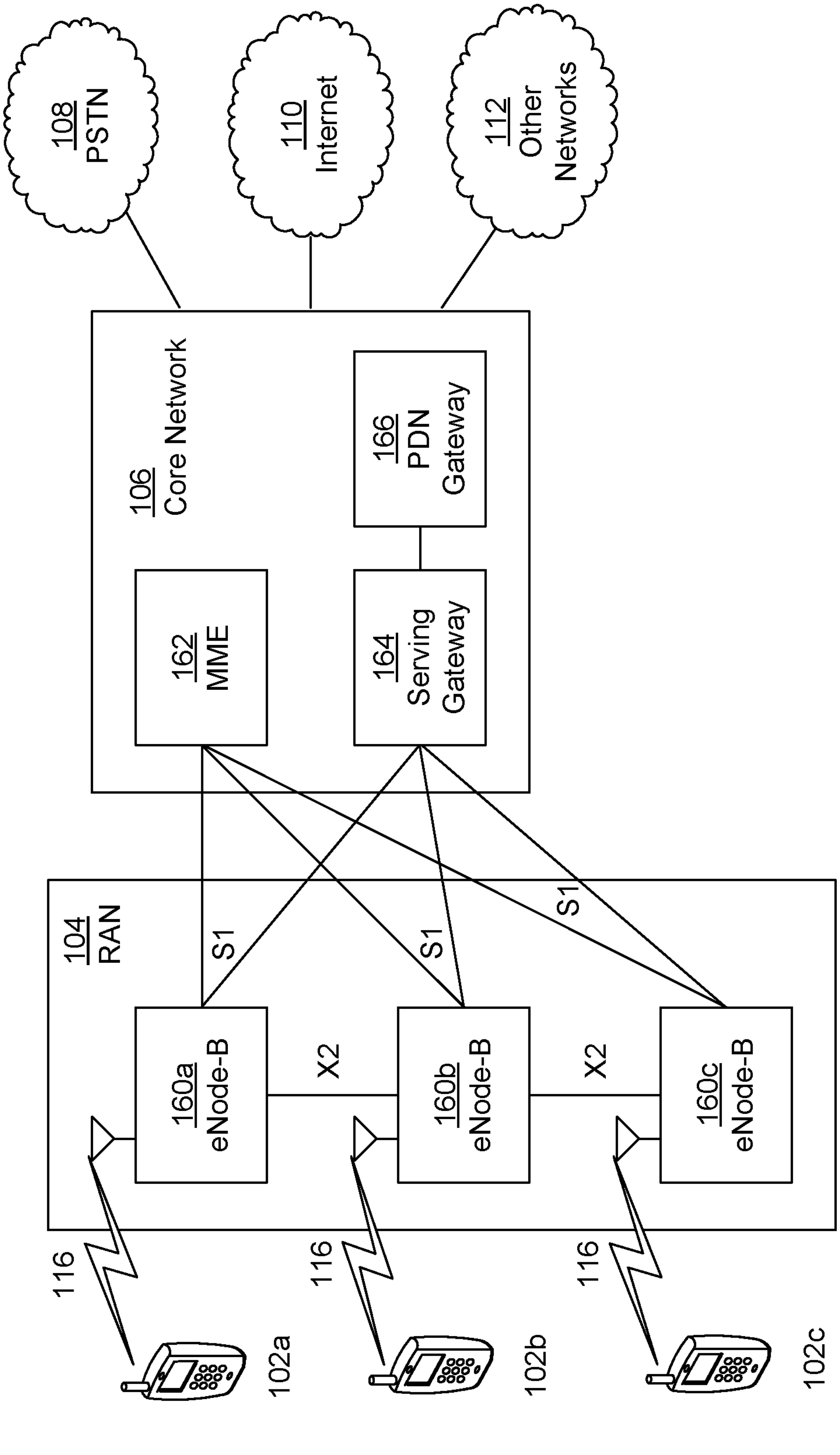
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, in which the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
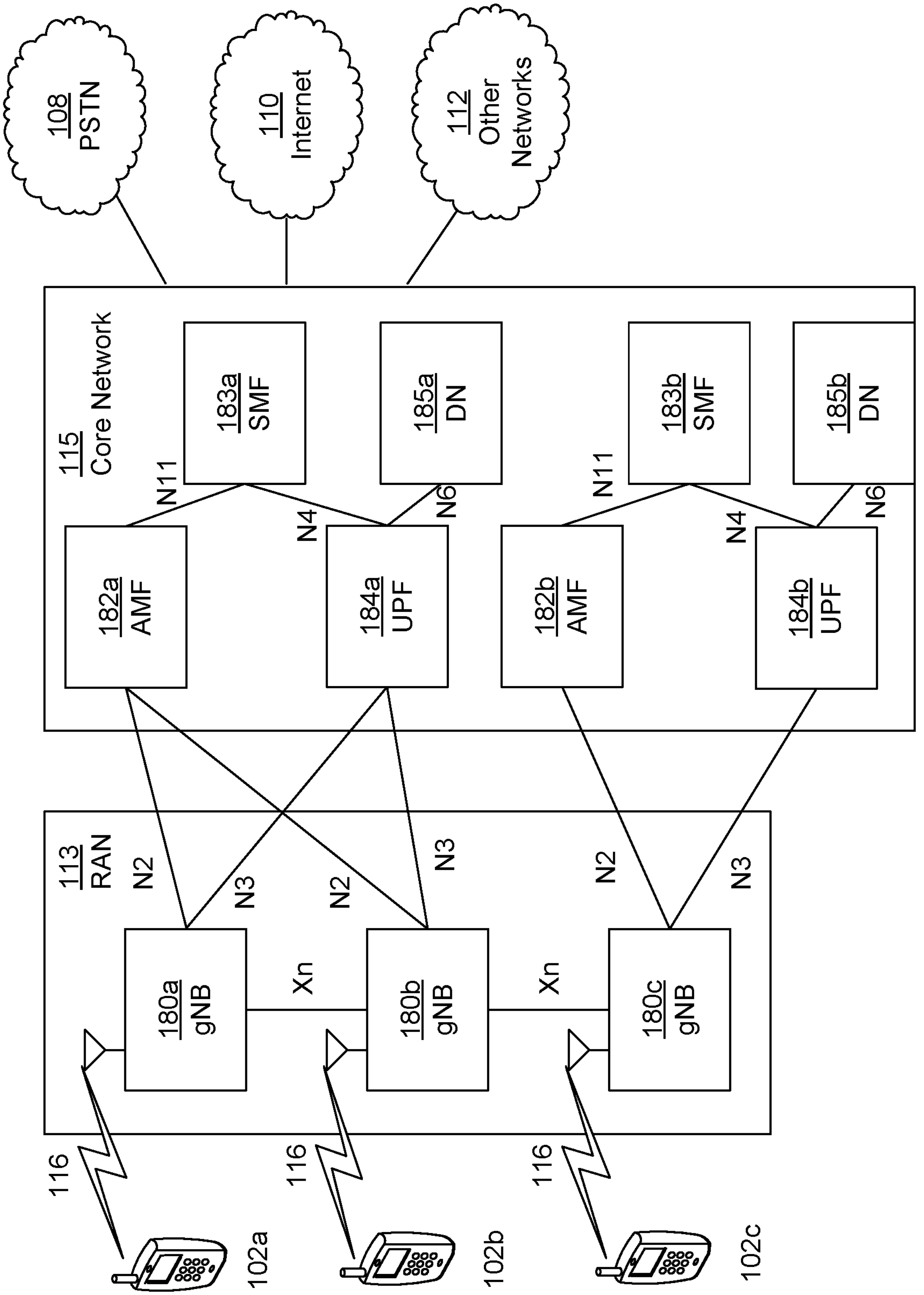
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-ab*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The following abbreviations and acronyms, among others, are used herein: Sub-carrier spacing (Δf); NR NodeB (gNB); Aperiodic (AP); Beam Failure Recovery (BFR); Beam Failure Detection-Reference Signal (BFD-RS); Block Error Rate (BLER); Bandwidth Part (BWP); Carrier Aggregation (CA); Contention-Based (e.g. access, channel, resource) (CB); Clear Channel Assessment (CCA); Code Division Multiplexing (CDM); Cell Group (CG); Cross Layer Interference (CLI); Coordinated Multi-Point transmission/reception (CoMP); Channel Occupancy Time (COT); Cyclic Prefix (CP); Common Phase Error (CPE); Conventional OFDM (relying on cyclic prefix) (CP-OFDM); Channel Quality Indicator (CQI); Core Network (e.g. LTE packet core and/or NR core) (CN); Cyclic Redundancy Check (CRC); Channel State Information (CSI); Channel State Information-Reference Signal (CSI-RS); Central Unit (CU); Device to Device transmissions (e.g. LTE Sidelink) (D2D); Dual Connectivity (DC); Downlink Control Information (DCI); Downlink (DL); Demodulation Reference Signal (DM-RS); Data Radio Bearer (DRB); Distributed Unit (DU); E-UTRA-NR Dual Connectivity (EN-DC); Evolved Packet Core (EPC); Frequency Domain-Code Division Multiplexing (FD-CDM); Frequency Division Duplexing (FDD); Frequency Division Multiplexing (FDM); Inter-Cell Interference (ICI); Inter-Cell Interference Cancellation (ICIC); Internet Protocol (IP); Listen-Before-Talk (LBT); Logical Channel (LCH); Logical Channel Identity (LCID); Logical Channel Prioritization (LCP); Low Latency Communications (LLC); Long Term Evolution e.g. from 3GPP LTE R8 and up (LTE); Medium Access Control (MAC); Medium Access Control Control Element (MAC CE); Negative ACK (NACK); Multimedia Broadcast Multicast System (MBMS); Master Cell Group (MCG); Modulation and Coding Scheme (MCS); Multiple Input Multiple Output (MIMO); Machine-Type Communications (MTC); Multi-RAT Dual Connectivity (MR-DC); Non-Access Stratum (NAS); New candidate beam-Reference Signal (NCB-RS); NR-RAN-E-UTRA Dual Connectivity (NE-DC); New Radio (NR); Dual Connectivity with (NR-DC); Orthogonal Cover Code (OCC); Orthogonal Frequency-Division Multiplexing (OFDM); Out-Of-Band (emissions) (OOB); Total available WTRU power in a given transmission interval ($P_{cmax}$); Primary cell of Master Cell Group (Pcell); Primary Cell Group (PCG); Protocol Data Unit (PDU); Packet Error Rate (PER); Physical Layer (PHY); Public Land Mobile Network (PLMN); Packet Loss Rate (PLR); Physical Random-Access Channel (PRACH); Physical Resource Block (PRB); PUCCH Resource Indicator (PRI); Positioning Reference Signal (PRS); Primary cell of a Secondary cell group (Pscell); Primary Synchronization Signal (PSS); Phase Tracking-Reference Signal (PT-RS); Quality of Service (from the physical layer perspective) (QoS); Radio Access Bearer (RAB); Radio Access Network Paging Area (RAN PA); Random Access Channel (or procedure) (RACH); Random Access Response (RAR); Radio Access Technology (RAT); Resource Block (RB); Radio access network Central Unit (RCU); Radio Front end (RF); Resource Element (RE); Radio Link Failure (RLF); Radio Link Monitoring (RLM); Radio Network Identifier (RNTI); Random Access Occasion (RO); Read-Only Mode (for MBMS) (ROM); Radio Resource Control (RRC); Radio Resource Management (RRM); Reference Signal (RS); Round-Trip Time (RTT); Subband non-overlapping full duplex (SBFD); Secondary Cell Group (SCG); Single Carrier Multiple Access (SCMA); Sub-Carrier Spacing (SCS); Service Data Unit (SDU); Spectrum Operation Mode (SOM); Semi-persistent (SP); Primary cell of a master and/or secondary cell group (SpCell); Signaling Radio Bearer (SRB); Synchronization Signal (SS); Sounding Reference Signal (SRS); Secondary Synchronization Signal (SSS); Supplementary UpLink (SUL); Switching Gap (in a self-contained subframe) (SWG); Transport Block (TB); Transport Block Size (TBS); Transmission Configuration Index (TCI); Time-Division Duplexing (TDD); Time-Division Multiplexing (TDM); Time Interval (in integer multiple of one or more symbols) (TI); Transmission Time Interval (in integer multiple of one or more symbols) (TTI); Transmission/Reception Point (TRP); Transmission/Reception Point Group (TRPG); Tracking Reference Signal (TRS); Transceiver (TRx); Uplink (UL); Ultra-Reliable Communications (URC); Ultra-Reliable and Low Latency Communications (URLLC); Vehicular communications (V2X); Wireless Local Area Networks and related technologies (IEEE 802.xx domain) (WLAN); and Cross Division Duplex (XDD)

In RAN #94-e, a RAN study item includes New Radio (NR) duplex operation. This technology may be the great foundation in improving conventional TDD operation by enhancing UL coverage, improving capacity, reducing latency, and so forth. The conventional TDD is based on splitting the time domain between the uplink and downlink. In NR Rel.18, the feasibility of allowing full duplex, and/or more specifically, subband non-overlapping full duplex (SBFD) at the gNB within a conventional TDD band is investigated, NR may support dynamic/flexible time division duplex (TDD) based on a slot format indicator (SFI) that can be indicated to a group of WTRUs by a group-common (GC) DCI (format 2_0). In addition, semi-static configurations via tdd-UL-DL-config-common/dedicated may be configured, such that the transmission pattern for each slot, symbol, and/or time instance may be configured as either of 'D' as downlink, 'U' as uplink, and 'F' as flexible (or 'S' as special time instance). In an operation with SBFD configured in a time instance with a first TDD direction (e.g., DL), one or more sets of subbands, PRBs, and/or BWPs may be configured with a second TDD direction (e.g., UL). As such, the subbands with the second TDD direction may enable higher coverage, increased capacity, more performance efficiency, and lower latency for transmission in the second TDD direction (e.g., UL).

Figure 2:
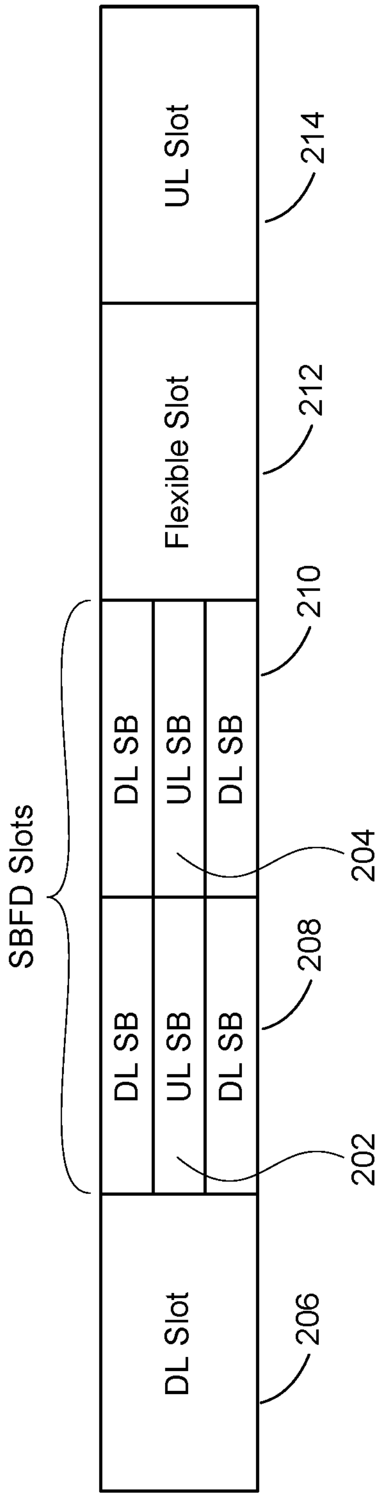
FIG. 2 is an example of a subband non-overlapping full duplex (SBFD)

As illustrated in FIG. 2, an example of a TDD configuration (e.g., DXXSU) is provided in which an UL subband 202,204 may be configured by RRC, MAC-CE and/or DCI via SBFD configuration information in DL slot number 2 208 and DL slot number 3 210, respectively, as part of SBFD configuration. FIG. 2 illustrates five slots: slot 1 206 (DL slot), slot 2 208 (SBFD slot), slot 3 210 (SBFD slot), slot 4 212 (flexible slot), and slot 5 214 (UL slot). "DXXSU" may refer to a DL slot, SBFD slot, SBFD slot, flexible slot, UL slot configuration. UL SBs 202, 204 may be configured to be located at any location/subband within the SBFD slots (e.g., top, bottom, middle, etc.). A flexible slot may be a slot used in TDD in which some symbols are configured as DL and some symbols are configured as UL, based on configurations. Slot 2 208 and slot 3 210 may be SBFD slots.

Figure 3:
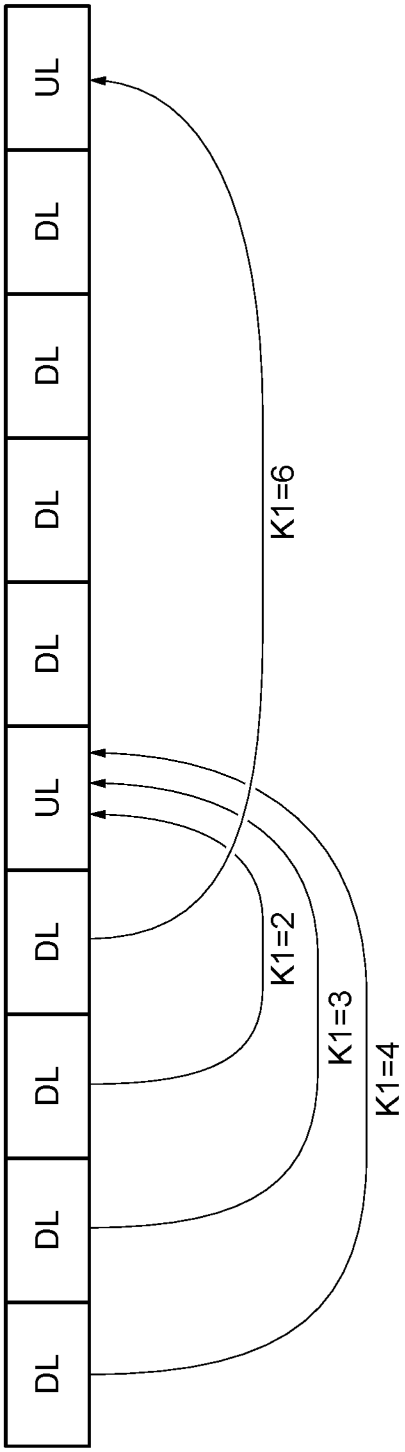
FIG. 3 is an example of different K1 values for an example slot configuration DDDDU time division duplex (TDD)

In TDD NR, HARQ-ACK transmission may be possible in symbols that do not overlap with a DL symbol indicated by tdd-UL-DL-ConfigurationCommon and/or tdd-UL-DL-ConfigurationDedicated if provided, and/or a symbol of an SS/PBCH block with an index provided by ssb-PositionsInBurst. HARQ-ACK timing may be configured via K1 indicated by parameter dl-DataToUL-ACK as part of PUCCH-Config, in which K1 points to the slot for the PUCCH transmission and may span from 0 up to 15 slots. As illustrated in FIG. 3, slot configuration DDDDU may include different K1 values (e.g., 2, 3, 4, 6). The size of the K1 value may be associated with the distance between the DL slot and an upcoming UL (e.g., PUCCH) transmission. For instance, when K1=2 there is an upcoming UL transmission two slots away, and when K1=4 there is an upcoming UL transmission 4 slots away.

Reducing the latency and enhancing the coverage may be key objectives in applying SBFD as described herein. This disclosure provides resource allocations for uplink transmission in SBFD UL subband. In particular, since the frequency band for SBFD subband is different (e.g., limited) compared to UL-only slots, this disclosure considers interpreting PUCCH and PUSCH frequency resource allocations, HARQ-ACK transmission, UL repetition, and frequency hopping. As provided herein, this disclosure discusses applying different FDRA, different frequency hopping offsets, and/or disabling/skipping some operations in SBFD and/or non-SBFD (e.g., UL-only, DL only) symbols; whereas such restricting schemes could result in lower coverage, lower capacity, and/or increased latency which may contradict the objectives of applying SBFD. As such, this disclosure contemplates the WTRU behavior when receiving grant for PUCCH/PUSCH transmission in a DL slot and/or DL symbols.

Further, this disclosure contemplates whether/how to indicate frequency/PRB resources for DL transmission when overlapping with SBFD UL subbands. Moreover, this disclosure contemplates whether/how to perform (multi-slot) UL/DL repetitions, in which the repetition instances may span both SBFD and UL-only/DL-only time instances. Further, this disclosure contemplates how a WTRU may use SBFD UL subbands to enhance coverage in transmission/reception of repetition for PUCCH/PUSCH/PDCCH/PDSCH for MIMO/multi-TRP.

It is noted that phrases such as 'a' and 'an' and similar phrases are to be interpreted as 'one or more' and 'at least one'. Similarly, any term which ends with the suffix '(s)' is to be interpreted as 'one or more' and 'at least one'. The term 'may' is to be interpreted as 'may, for example'. Moreover, it is noted that the phrases 'serving cell' and 'component carrier' may be used interchangeably herein. Further, it is noted that the terms occasions, time instances, and time units may be used interchangeably herein.

A WTRU may transmit and/or receive a physical channel and/or reference signal according to at least one spatial domain filter. It is noted that the term "beam" may be used to refer to a spatial domain filter.

The WTRU may transmit a physical channel and/or signal using the same spatial domain filter as the spatial domain filter used for receiving an RS (such as CSI-RS) and/or a SS block. In some cases, the WTRU transmission may be referred to as "target", and the received RS and/or SS block may be referred to as "reference" and/or "source". In such cases, the WTRU may be said to transmit the target physical channel and/or signal according to a spatial relation with a reference to such RS and/or SS block.

The WTRU may transmit a first physical channel and/or signal according to the same spatial domain filter as the spatial domain filter used for transmitting a second physical channel and/or signal. The first and second transmissions may be referred to as "target" and "reference" (or "source"), respectively. In such cases, the WTRU may transmit the first (target) physical channel and/or signal according to a spatial relation with a reference to the second (reference) physical channel and/or signal.

In one or more cases, a spatial relation may be implicit, configured by RRC and/or signaled by MAC CE and/or DCI. In another example, a spatial relation may be configured by RRC for an SRS resource indicator (SRI) and/or signaled by MAC CE for a PUCCH. Such spatial relation may also be referred to as a "beam indication".

The WTRU may receive a first (target) downlink channel and/or signal according to the same spatial domain filter and/or spatial reception parameter as a second (reference) downlink channel and/or signal. For example, such association may exist between a physical channel such as PDCCH and/or PDSCH and its respective DM-RS. At least when the first and second signals are reference signals, such association may exist when the WTRU is configured with a quasi-colocation (QCL) assumption type D between corresponding antenna ports. Such association may be configured as a TCI (transmission configuration indicator) state. A WTRU may be indicated an association between a CSI-RS and/or SS block and a DM-RS by an index to a set of TCI states configured by RRC and/or signaled by MAC CE. Such indication may also be referred to as a "beam indication".

A WTRU may receive and/or be configured and/or be provided with one or more PUCCH resource sets (e.g., PUCCH-ResourceSet in PUCCH-Config). The WTRU may receive PUCCH configuration information. The WTRU may receive subband non-overlapping full duplex (SBFD) configuration information. The SBFD configuration information may indicate one or more orthogonal frequency division multiplexing (OFDM) symbols that are associated with one or more subbands for uplink transmission and one or more subbands for downlink reception.

A PUCCH resource set may include one or more PUCCH resources. In one or more cases, a PUCCH resource may include one or more of the following parameters. For example, a PUCCH resource may include a PUCCH resource index (e.g., pucch-ResourceId). In another example, a PUCCH resource may include an index indication for the first PRB prior to frequency hopping and/or for no frequency hopping (e.g., startingPRB). In another example, a PUCCH resource may include an index indication for the first PRB after frequency hopping (e.g., secondHopPRB). In another example, a PUCCH resource may include an indication for intra-slot frequency hopping (e.g., intraSlotFrequencyHopping). In another example, a PUCCH resource may include an index indication for a first and/or second interlace (e.g., interlace0 and/or interlace1, respectively), and/or an index indication for respective RB set (e.g., rb-SetIndex). In another example, a PUCCH resource may include a configuration for the PUCCH format (e.g., format). The PUCCH format can be selected from one or more (pre)configured formats.

A first and/or a second PUCCH resource may be in slot symbols. PUCCH configuration information may comprise a number of transmission repetitions. The PUCCH may be transmitted using a frequency domain resource allocation (FDRA). The DCI may indicate that the first PRI is for HARQ-ACK transmission. Determining the second PUCCH resource may comprise re-indexing PUCCH resources. Transmitting the PUCCH transmission may be in time units configured for SBFD.

An example of PUCCH formats 3 and 4 and parameters that may be included for each format is illustrated in FIG. 4. It is noted that the example parameters are non-limiting examples of the parameters that may be included in the PUCCH format and the PUCCH resource configuration. One or more of those parameters may be included. The number of bits and choices for each parameter are examples. Other numbers of bits and/or choices may be included.

A PUCCH format may include one or more parameters indicated for the respective PUCCH transmission. The parameters may include but are not limited to: a starting symbol index (e.g., startingSymbolIndex), a number of symbols (e.g., nrofSymbols), a number of PRBs (e.g., nrofPRBs), initial cyclic shift values (e.g., initialCyclicShift), parameters for configuring orthogonal cover code (OCC) (e.g., timeDomainOCC, occ-Length, occ-Index), and so forth. The PUCCH configuration may include one or more parameters (e.g., PUCCH-SpatialRelationInfo, pucch-SpatialRelationInfold, TCI-State_r17) for indicating the spatial relation and/or setting for respective PUCCH transmission. The spatial setting and/or relation may be based on one or more reference signals and/or beam resources (e.g., ssb-Index, csi-RS-Index, srs, and so forth).

A WTRU may report HARQ-ACK information for the reception of a PDSCH, reception of an SPS PDSCH release, and/or reception of a TCI state update in a slot indicated by a corresponding (e.g., activating) DCI (e.g., indicated by a PDSCH-to-HARQ_feedback timing indicator field), and/or provided by PUCCH-Config (e.g., dl-DataToUL-ACK, dl-DataToUL-ACK-r16, and/or dl-DataToUL-ACK-ForDCI-Format1-2). In an example, the timing indicator value in corresponding DCI may map to fixed slot locations, for example based on SCS configuration of PUCCH transmission (e.g., DCI format 1_0). In another example, the timing indicator value in corresponding DCI may map to select slot locations from a set of RRC-configured number of slots (e.g., dl-DataToUL-ACK, dl-DataToUL-ACK-r16, dl-DataToUL-ACKForDCIFormat1_2, and/or dl-DataToUL-ACK-r17, and so forth).

A TRP (e.g., transmission and reception point) may be interchangeably used with one or more of TP (transmission point), RP (reception point), RRH (radio remote head), DA (distributed antenna), BS (base station), a sector (of a BS), and a cell (e.g., a geographical cell area served by a BS), but still consistent with the disclosure provided herein. Multi-TRP may be interchangeably used with one or more of MTRP, M-TRP, and multiple TRPs, but still consistent with the disclosure provided herein.

The term “subband” and/or “sub-band” may be used to refer to a frequency-domain resource. Further, the term “subband” and/or “sub-band” may be characterized by at least one of the following: a set of resource blocks (RBs); a set of resource block sets (RB sets) (e.g., when a carrier has intra-cell guard bands); a set of interlaced resource blocks; a bandwidth part, and/or portion thereof; and/or a carrier, and/or portion thereof. For example, a subband may be characterized by a starting RB and number of RBs for a set of contiguous RBs within a bandwidth part. A subband may also be defined by the value of a frequency-domain resource allocation field and bandwidth part index.

The term “XDD” may be used to refer to a subband-wise duplex (e.g., either UL and/or DL being used per subband). Further, the term “XDD” may be characterized by at least one of the following: a Cross Division Duplex (e.g., sub-band-wise FDD within a TDD band); a subband non-overlapping full duplex (SBFD); a subband-based full duplex (e.g., full duplex as both UL and DL are used/mixed on a symbol/slot, but either UL and/or DL being used per subband on the symbol/slot); a frequency-domain multiplexing (FDM) of DL/UL transmissions within a TDD spectrum; a subband non-overlapping full duplex (e.g., non-overlapped sub-band full duplex); a full duplex other than a same-frequency (e.g., spectrum sharing, subband-wise-overlapped) full duplex; and/or an advanced duplex method, e.g., other than (pure) TDD and/or FDD.

The term “dynamic TDD” and/or “dynamic/flexible TDD” may refer to a TDD system and/or cell which may dynamically (and/or flexibly) change/adjust/switch a communication direction (e.g., a downlink, an uplink, and/or a sidelink, etc.) on a time instance (e.g., slot, symbol, subframe, and/or the like). In an example, in a system employing dynamic/flexible TDD, a component carrier (CC), and/or a bandwidth part (BWP) may have one single type among ‘D’, ‘U’, and ‘F’ on a symbol/slot, based on an indication by a DCI such as a group-common(GC)-DCI (e.g., format 2_0) comprising a slot format indicator (SFI), and/or based on tdd-UL-DL-config-common and/or dedicated configurations. The term component carrier may refer to set of frequencies, one or more BWPs, serving cell, and so forth. On a given time instance (e.g., slot and/or symbol), a first gNB (e.g., cell, TRP) employing dynamic/flexible TDD may transmit a downlink signal to a first WTRU being communicated and/or associated with the first gNB, for example, based on a first SFI and/or tdd-UL-DL-config configured and/or indicated by the first gNB. A second gNB (e.g., cell, TRP) employing dynamic/flexible TDD may receive an uplink signal transmitted from a second WTRU being communicated and/or associated with the second gNB, for example, based on a second SFI and/or tdd-UL-DL-config configured/indicated by the second gNB. In an example, the first WTRU may determine that the reception of the downlink signal is being interfered with by the uplink signal, in which the interference caused by the uplink signal may refer to a WTRU-to-WTRU cross-layer interference (CLI).

A WTRU may report a subset of channel state information (CSI) components, in which CSI components may correspond to at least a CSI-RS resource indicator (CRI), a SSB resource indicator (SSBRI), an indication of a panel used for reception at the WTRU (such as a panel identity and/or group identity), measurements such as L1-RSRP, L1-SINR taken from SSB and/or CSI-RS (e.g. cri-RSRP, cri-SINR, ssb-Index-RSRP, ssb-Index-SINR), and other channel state information such as at least rank indicator (RI), channel quality indicator (CQI), precoding matrix indicator (PMI), Layer Index (LI), and/or the like.

A WTRU may receive a synchronization signal/physical broadcast channel (SS/PBCH) block. The SS/PBCH block (SSB) may include a primary synchronization signal (PSS), secondary synchronization signal (SSS), and physical broadcast channel (PBCH). The WTRU may monitor, receive, and/or attempt to decode an SSB during initial access, initial synchronization, radio link monitoring (RLM), cell search, cell switching, and so forth.

A WTRU may measure and report the channel state information (CSI), in which the CSI for each connection mode may include and/or be configured with one or more of following: CSI Report Configuration; CSI-RS Resource Set; and/or NZP CSI-RS Resources. In some cases, a CSI Report Configuration may include one or more of the following: CSI report quantity (e.g., Channel Quality Indicator (CQI), Rank Indicator (RI), Precoding Matrix Indicator (PMI), CSI-RS Resource Indicator (CRI), Layer Indicator (LI), and the like); CSI report type (e.g., aperiodic, semi persistent, and/or periodic); a CSI report codebook configuration (e.g., Type I, Type II, Type II port selection, and the like); and/or CSI report frequency. In one or more cases, a CSI-RS Resource Set may include one or more of the following CSI Resource settings: NZP-CSI-RS Resource for channel measurement; NZP-CSI-RS Resource for interference measurement; and/or CSI-IM Resource for interference measurement. In one or more cases, NZP CSI-RS Resources may include one or more of the following: NZP CSI-RS Resource ID; Periodicity and offset; QCL Info and TCI-state; and/or Resource mapping (e.g., number of ports, density, CDM type, and the like).

A WTRU may indicate, determine, and/or be configured with one or more reference signals. The WTRU may monitor, receive, and measure one or more parameters based on the respective reference signals. For example, one or more of the following may apply. The following parameters are non-limiting examples of the parameters that may be included in reference signal(s) measurements. One or more of these parameters may be included. Other parameters may be included.

A WTRU may be configure with SS reference signal received power (SS-RSRP). The SS-RSRP may be measured based on the synchronization signals (e.g., demodulation reference signal (DMRS) in PBCH and/or SSS). The SS-RSRP may be defined as the linear average over the power contribution of the resource elements (RE) that carry the respective synchronization signal. Power scaling for the reference signals may be determined to measure RSRP. In case SS-RSRP is used for L1-RSRP, the measurement may be accomplished based on CSI reference signals in addition to the synchronization signals.

A WTRU may be configured with CSI-RSRP. CSI-RSRP may be measured based on the linear average over the power contribution of the resource elements (RE) that carry the respective CSI-RS. The CSI-RSRP measurement may be configured within measurement resources for the configured CSI-RS occasions.

A WTRU may be configured with SS signal-to-noise and interference ration (SS-SINR). SS-SI NR may be measured based on the synchronization signals (e.g., DMRS in PBCH and/or SSS). It may be defined as the linear average over the power contribution of the resource elements (RE) that carry the respective synchronization signal divided by the linear average of the noise and interference power contribution. In case SS-SI NR is used for L1-SINR, the noise and interference power measurement may be accomplished based on resources configured by higher layers.

A WTRU may be configured with CSI-SINR. CSI-SINR may be measured based on the linear average over the power contribution of the resource elements (RE) that carry the respective CSI-RS divided by the linear average of the noise and interference power contribution. In case CSI-SINR is used for L1-SINR, the noise and interference power measurement may be accomplished based on resources configured by higher layers. Otherwise, the noise and interference power may be measured based on the resources that carry the respective CSI-RS.

A WTRU may be configured with received signal strength indicator (RSSI). RSSI may be measured based on the average of the total power contribution in configured OFDM symbols and bandwidth. The power contribution may be received from different resources (e.g., co-channel serving and non-serving cells, adjacent channel interference, thermal noise, and so forth).

A WTRU may be configured with a Cross-Layer interference received signal strength indicator (CLI-RSSI). A CLI-RSSI may be measured based on the average of the total power contribution in configured OFDM symbols of the configured time and frequency resources. The power contribution may be received from different resources (e.g., cross-layer interference, co-channel serving and non-serving cells, adjacent channel interference, thermal noise, and so forth).

A WTRU may be configured with a sounding reference signals RSRP (SRS-RSRP). SRS-RSRP may be measured based on the linear average over the power contribution of the resource elements (RE) that carry the respective SRS.

In one or more cases, a property of a grant and/or assignment may consist of at least one of the following: a frequency allocation; an aspect of time allocation, such as a duration; a priority; a modulation and coding scheme; a transport block size; a number of spatial layers; a number of transport blocks; a TCI state, CRI and/or SRI; a number of repetitions; whether the repetition scheme is Type A and/or Type B; whether the grant is a configured grant type 1, type 2 and/or a dynamic grant; whether the assignment is a dynamic assignment and/or a semi-persistent scheduling (configured) assignment; a configured grant index and/or a semi-persistent assignment index; a periodicity of a configured grant and/or assignment; a channel access priority class (CAPC); and/or any parameter provided in a DCI, by MAC and/or by RRC for the scheduling the grant and/or assignment.

An indication by DCI may include at least one of the following: an explicit indication by a DCI field and/or by RNTI used to mask CRC of the PDCCH; and/or an implicit indication by a property such as DCI format, DCI size, Coreset and/or search space, Aggregation Level, first resource element of the received DCI (e.g., index of first Control Channel Element), in which the mapping between the property and the value may be signaled by RRC and/or MAC.

A signal may be interchangeably used with one or more of following: sounding reference signal (SRS); channel state information-reference signal (CSI-RS); semodulation reference signal (DM-RS); phase tracking reference signal (PT-RS); and/or synchronization signal block (SSB).

A channel may be interchangeably used with one or more of following: physical downlink control channel (PDCCH); physical downlink shared channel (PDSCH); physical uplink control channel (PUCCH); physical uplink shared channel (PUSCH); and/or physical random access channel (PRACH).

A downlink reception may be used interchangeably with Rx occasion, PDCCH, PDSCH, and/or SSB reception. An uplink transmission may be used interchangeably with Tx occasion, PUCCH, PUSCH, PRACH, SRS transmission. A RS may be interchangeably used with one or more of RS resource, RS resource set, and/or RS port and RS port group. A RS may be interchangeably used with one or more of SSB, CSI-RS, SRS, and DM-RS. A time instance, slot, symbol, subframe, may be used interchangeably. UL-only and DL-only Tx/Rx occasions may interchangeably be used with legacy TDD UL and/or legacy TDD DL, respectively. In an example, the legacy TDD UL/DL Tx/Rx occasions may be cases in which SBFD is not configured and/or in which the SBFD is disabled. A sign, symbol, and/or mark of forward slash '/' may to be interpreted as 'and/or' unless particularly mentioned otherwise, where for example, 'A/B' may imply 'A and/or B'.

The solutions provided in this disclosure may be applicable to an uplink transmission (e.g., PUCCH, PUSCH, SRS, PRACH, and so forth) and/or a set of uplink transmissions (e.g., repetition) for PUCCH occasions transmitted according to a PUCCH configuration and/or PUSCH occasions transmitted according to a grant such as a configured grant. The WTRU may be configured with an uplink transmission and/or repetition in an UL-only time instance, in which the UL resources may be used for an UL transmission and/or repetition in UL subbands of a SBFD time instance. The number/length of subbands configured for UL-only time instance may span larger subbands than the uplink subbands in SBFD time instance. For example, all RBs in a BWP may be used for uplink in an uplink-only slot/symbol while a subset of RBs in a BWP may be used for uplink in a SBFD slot/symbol.

The solutions described in this disclosure may be applicable to a downlink reception (e.g., SPS PDSCH, PDCCH, CSI-RS, and so forth) and/or a set of downlink receptions (e.g., repetition) configured in a DL-only time instance, in which the configured PDSCH resources may be used for DL reception and/or repetition in a DL subbands of a SBFD configured time instance. In an example, the SBFD may be configured for one or more uplink subbands in a legacy DL time instance, in which the remaining subbands will be used for DL. Alternatively, the SBFD may be configured for one or more downlink subbands in a legacy uplink time instance, in which the remaining subbands may be used for UL. In this case, the number/length of subbands configured for DL-only time instance may span larger subbands than the downlink subband in SBFD time instance. For example, all RBs in a BWP may be used for DL in a DL-only slot/symbol while a subset of RBs in a BWP may be used for DL in a SBFD slot/symbol.

In one or more cases, the WTRU may be configured for resource allocation when using SBFD. A WTRU may receive and/or be configured with one or more resource allocation settings for uplink transmission (e.g., channels) in one or more Tx occasions. For example, for control uplink transmission (e.g., PUCCH), the resource configuration (e.g., for each resource allocation setting) may include one or more parameters, such as starting PRB, second hop starting PRB, number of PRBs, number of slots, starting symbol index, PUCCH format, cyclic shift, OCC config, and so forth that may be indicated based on a PUCCH resource index/indicator (e.g., PUCCH-ResourceId). In an example, for a downlink (shared) channel transmission (e.g., PDSCH) which may be configured by semi-static indications (e.g., SPS PDSCH configured by SPS-Config), the WTRU may determine, receive, and/or be configured with an associated PUCCH resource index/indicator to be used for sending corresponding control information (e.g., HARQ-ACK, CSI report, and so forth). For instance, the time resources (e.g., slot) for transmission of HARQ-ACK in respective PUCCH may be defined based on one or more RRC-configured parameters (e.g., K1 defined via dl-DataToUL-ACK in PUCCH-Config in BWP-UplinkDedicated), and/or activated by DCI (e.g., format 1_1 and/or 1_2 with a value of PDSCH-to-HARQ_feedback timing indicator field).

In one or more cases, a WTRU may be configured with PUCCH resource sets and a PUCCH resource indicator (PRI). The WTRU may receive PUCCH configuration information. A WTRU may receive and/or be configured with one or more PUCCH resource sets, including one or more PUCCH resources. In an example, a PUCCH resource may configure parameters including PUCCH resource index, index for the first PRB, index for the first PRB for frequency hopping, PUCCH format, starting symbol index, number of symbols, number of PRBs, and so forth. A WTRU may receive and/or be configured with a PUCCH resource indicator (PRI) (e.g., via DCI such as a DL grant DCI). In an example, the PRI may be indicated by a number of bits (e.g., such as up to three (3) bits). The PRI may indicate a PUCCH resource. The PRI may indicate a PUCCH resource from among a set of (configured) PUCCH resources, which may be provided by a PUCCH resource set. The PUCCH resources and/or PUCCH resource set may be received from and/or configured by a gNB. The WTRU may use the PRI to determine the resource allocations (e.g., time and/or frequency resources) to be used for PUCCH transmission (e.g., for the HARQ-ACK feedback for a PDSCH indicated by the DL grant DCI).

The WTRU may receive DCI comprising a first PRI. The WTRU may determine that a PUCCH transmission indicated by the DCI is to be sent using at least one or more OFDM symbols that are associated with a set of one or more subbands for uplink transmission and a set of one or more subbands for downlink reception indicated by SBFD configuration information. The WTRU may determine, based on a first rule of interpreting the first PRI and the PUCCH configuration information, that a first PUCCH resource indicated by the first PRI is included in at least one frequency resource that is at least partially included in at least one subband of the set of one or more subbands for uplink transmission and/or one subband of the set of one or more subbands for downlink reception indicated by the SBFD configuration information. The WTRU may determine a second PUCCH resource in response to the determination that the first PUCCH resource indicated by the first PRI is included in at least one frequency resource that is at least partially included in at least one subband of the set of one or more subbands for uplink transmission and/or one subband of the set of one or more subbands for downlink reception indicated by the SBFD configuration information. The second PUCCH resource may be determined based on a second rule for interpreting the first PRI and the PUCCH configuration information. The second PUCCH resource may be within the set of one or more subbands for uplink transmission indicated by the SBFD configuration information. The WTRU may transmit the PUCCH transmission using the second frequency resource.

The second rule may comprise applying a frequency offset to the first PUCCH resource. The second rule may comprise applying a different mapping for the first PRI to PUCCH resources for transmissions associated with the SFBD configuration information and the first PRI. The second rule may map the first PRI to a second PRI. The second PRI may be used for determining the second PUCCH resource. The second PRI may be used for SBFD uplink transmissions based on an association with non-SBFD PRIs.

In one or more cases, the configured and/or received resource configurations in frequency (e.g., PRB allocation, PRB indexes) may be based on a BWP. In an example, the BWP may be the active BWP that is linked to the respective Tx occasions. In other words, the resource configurations (e.g., PRB allocation, PRB indexes) may be based on an active linked BWP. As such, the indexes used for a PRB indication for the resource allocations may be based on the whole (active)(linked) BWP (e.g., as in Tx occasions with UL-only configurations in TDD). In an example, for the active uplink BWP (e.g., indicated with bwp-id), if the number of total available PRBs are N, then the PRB indexes used in the resource configurations may be indexed from 0 to N. As such, a WTRU may be configured to determine whether/how to indicate frequency/PRB resources for transmission in SBFD UL subbands.

In one or more cases, a WTRU (e.g., a SBFD-enabled WTRU) may receive and/or be configured with one or more SBFD UL and/or DL subbands in one or more symbols which may be (e.g., previously) configured as a DL, UL, and/or flexible symbol. The configuration as DL, UL, and/or flexible may be based on one or more TDD UL/DL configurations the WTRU may receive such as a common TDD UL/DL configuration, a dedicated TDD UL/DL configuration and/or a SFI (e.g., a dynamically indicated SFI). The WTRU may be configured with one or more time and frequency resource allocations for SBFD subbands.

In one or more cases, the SBFD configuration may include a flag signal (e.g., enabled/disabled), in which for example one value (e.g., the value of zero (0)) may indicate no SBFD configuration (e.g., SBFD not enabled), and another value (e.g., the value of one (1)) may indicate SBFD configuration enabled. The SBFD configurations may be indicated via SIB, semi-statically (e.g., via RRC), dynamic (e.g., via MAC-CE, DCI), and so forth. The WTRU may receive an indication of the time resources (e.g., one or more symbols, slots, and so forth), for which the SBFD is applicable for a serving cell, carrier, and/or BWP. The WTRU may receive the frequency resources (e.g., subbands, BWPs, and/or one or more PRBs) for which the SBFD may be configured. The SBFD configuration may be configured for (e.g., linked to) a BWP and/or applied to a BWP such as an active BWP. The time instances (e.g., slots, symbols) configured for SBFD may be indicated based on periodic, semi-persistent, and/or aperiodic configurations. In an example, the time instances may be indicated via a bitmap configuration.

In an example, a WTRU may be configured with a DL TDD configuration for a component carrier (CC) and/or a BWP for one or more Rx occasions (e.g., via tdd-UL-DL-config-common/dedicated configurations, slot format indicator (SFI), and so forth). The WTRU may receive and/or be configured with SBFD operation as part of the TDD DL configuration in the respective time instance. As such, if the SBFD is configured, the configured frequency resources (e.g., subbands/PRBs/BWPs) may be configured for UL channels/Tx occasions. In another example, the WTRU may be configured with an UL TDD configuration for a component carrier (CC) and/or a BWP for one or more Tx occasions (e.g., via tdd-UL-DL-config-common/dedicated configurations, slot format indicator (SFI), and so forth). The WTRU may further receive and/or be configured with SBFD configuration as part of the TDD UL configuration in the respective time instance. As such, if the SBFD is configured, the configured frequency resources (e.g., subbands/PRBs/BWPs) may be configured for DL channels/Rx occasions. In another example, the WTRU may be configured with a DL/UL/Flexible TDD configuration for a component carrier (CC) and/or a BWP for one or more Rx/Tx occasions (e.g., via tdd-UL-DL-config-common/dedicated configurations, slot format indicator (SFI), and so forth). The WTRU may receive and/or be configured with SBFD operation as part of the TDD DL/UL/Flexible configuration in the respective time instance. As such, if the SBFD is configured, the configured frequency resources (e.g., subbands/PRBs/BWPs) may be configured for either UL transmission and/or DL reception based on the configurations. The duplexing mode for SBFD configuration (UL/DL) may be indicated via a flag, in which for example a first value (e.g., zero (0)) may indicate UL duplexing mode, and a second value (e.g., one (1)) may indicate DL duplexing model. The SBFD duplexing mode configuration/flag may be configured as part of SBFD configuration that may be semi-static (e.g., via RRC) and/or dynamic (e.g., via DCI, MAC-CE). The SBFD duplexing mode configuration/flag may be configured as part of resource allocation configuration for a Tx/Rx occasion.

In one or more cases, a WTRU may be configured for PUCCH Resource Determination in SBFD. The WTRU may receive PUCCH configuration information. In one or more cases, a WTRU may receive and/or be configured with one or more PUCCH transmission configurations within and/or for an SBFD symbol and/or slot (symbol/slot), in which the PUCCH configurations may include a PUCCH resource indicator (PRI). In an example, a DCI format with a DL dynamic grant and/or a DCI format activating and/or releasing an SPS PDSCH may include an indication of the PRI to corresponding PUCCH resources. The WTRU may use the indicated PRI to determine the resources for transmission of the respective PUCCH (e.g., including HARQ-ACK, CSI-RS, and so forth).

The WTRU may determine the time-domain resources for the PUCCH transmission, in which the time-domain resources may be mapped to a TDD DL time instance (e.g., one or more symbols and/or slots). In an example, the WTRU may be configured with a HARQ-ACK transmission, in which the configured K1 may point to a DL symbol and/or slot. As such, the WTRU may determine if the configured TDD DL time instance is configured with SBFD and if the SBFD operation in enabled (e.g., based on respective enabled/disabled flag). In case the SBFD is not enabled for the TDD DL time instance, the WTRU may skip transmission of PUCCH in respective time instance and may monitor, detect, and/or find the next UL Tx occasion.

In one or more cases, a WTRU may determine that the configured and/or received PRI maps to the time resources that correspond to an SBFD-configured symbol and/or slot and/or Tx occasion (e.g., SBFD configuration flag is enabled). As such, the WTRU may determine if the frequency resources corresponding to the received/configured PRI are mapped to the PRBs, subbands, and/or BWPs corresponding to the frequency resources that may be configured for SBFD. The WTRU may use the received PRI to determine the frequency resources that may be configured for transmission of the respective PUCCH. The WTRU may determine if the frequency resources that are configured for transmission of the respective PUCCH are overlapping with the frequency resources that may be configured for SBFD operation.

In an example, the WTRU may be configured with SBFD in a time instance (e.g., symbol/slot/tx occasion), where the starting PRB corresponding to the SBFD's subband and/or PRBs and/or BWP may be indicated by a PRB index N1, and the last PRB corresponding to the SBFD's subband and/or PRBs and/or BWP may be indicated by a PRB index N2. As such, the WTRU may determine if the PRBs corresponding to the PUCCH transmission (e.g., configured by PRI via starting PRB and number of PRBs) are mapped to the PRBs in between indexes N1 and N2.

In cases in which the frequency-domain resources corresponding to PUCCH transmission overlap with the subbands, PRBs, and/or BWP (e.g., located within SBFD boundaries) corresponding to the SBFD configuration, the WTRU may determine to transmit respective PUCCH.

In one or more cases, a WTRU may determine that the frequency-domain resources corresponding to PUCCH transmission are partly/totally outside the subbands, PRBs, and/or BWP boundary (e.g., PRB indexes between N1 and N2) corresponding to the SBFD configuration. As such the WTRU may determine one or more modes of operation based on one or more explicitly and/or implicitly determined parameters (e.g., by gNB). If a WTRU transmits an uplink (e.g., PUCCH/PUSCH) in an SBFD time instance, the WTRU may determine if the WTRU is provided with one or more values to determine the resource locations implicitly and/or explicitly for respective UL transmission within SBFD resources.

In one or more cases, if a WTRU is configured with an uplink transmission in a downlink time instance, the WTRU may determine the resources for transmission based on one or more of the following. The WTRU may determine to resolve overlapping with symbols in the slot indicated as downlink (e.g., by tdd-UL-DL-ConfigurationCommon, and/or tdd-UL-DL-ConfigurationDedicated). The WTRU may determine if the DL time instance is configured with SBFD configuration (e.g., SBFD is enabled, and respective time and frequency resources are configured). If SBFD is not enabled, the WTRU may skip UL transmission in respective DL time instance. The WTRU may determine if the resource allocation for respective uplink transmission is within the resources configured for the SBFD uplink subbands in respective time instance. In one or more cases in which the resources configured for UL transmission are out of the SBFD boundaries (e.g., frequency-domain resources), the WTRU may determine if the WTRU is provided with one or more values to determine the resource locations implicitly and/or explicitly for respective UL transmission within SBFD resources. The WTRU may determine the new and/or reinterpreted and/or re-indexed resources for respective UL transmission in SBFD time instance.

In one or more cases, the WTRU may be configured for downlink resource allocations in SBFD symbols. A WTRU may receive and/or be configured with one or more SPS (Semi-Persistent Scheduling) configurations in a BWP (e.g., via sps-Config and/or sps-ConfigToAddModList), in which the SPS configuration may include periodicity of transmission, PDSCH aggregation factor, and so forth. The WTRU may receive a DCI (e.g., format 1_1 and/or 1_2) that may activate one or more SPS transmissions (e.g., CRC scrambled with CS-RNTI), in which the DCI may include time and frequency configurations for respective PDSCH transmission. One or more of the PDSCH transmissions may happen to be scheduled in the DL time instances that may be configured with SBFD configuration. As such, some subbands/PRBs within respective DL time instance may be allocated/configured as UL subbands and for UL transmission (e.g., in case of dynamic SBFD configuration in respective time instance). In that case, the frequency-domain allocations for one or more of the (SPS) PDSCH transmissions may overlap with the configured SBFD UL subbands in respective time instance. As such, the WTRU may be configured to determine whether/how to indicate frequency/PRB resources for DL transmission when overlapping with SBFD UL subbands.

In one or more cases, a WTRU may be configured with a downlink transmission in a downlink time instance, in which one or more UL SBFD subbands, BWPs, and/or PRBs may be enabled/disabled. Alternatively, the WTRU may be configured with a DL transmission in an UL time instance, in which one or more DL SBFD subbands, BWPs, and/or PRBs may be enabled/disabled.

In one or more cases, if a WTRU is configured with a downlink transmission in a downlink time instance with SBFD configuration, the WTRU may determine the resources for transmission based on one or more of the following. The WTRU may determine to resolve overlapping with symbols in the slot indicated as downlink (e.g., by tdd-UL-DL-ConfigurationCommon, and/or tdd-UL-DL-ConfigurationDedicated). The WTRU may determine if the DL time instance is configured with SBFD configuration (e.g., SBFD is enabled, and respective time and frequency resources are configured). If SBFD is enabled, the WTRU may determine if the resource allocation for respective downlink transmission is overlapping with the resources configured for the SBFD uplink subbands in respective time instance. In case the resources have partial/full overlap (e.g., frequency-domain resources), the WTRU may determine if the WTRU is provided with one or more values to determine the resource locations implicitly and/or explicitly for respective DL transmission within SBFD resources. The WTRU may determine the new, reinterpreted, and/or re-indexed resources for respective DL transmission in SBFD time instance. The WTRU may determine, based on the SBFD configuration information and a first FDRA, that a first frequency resource is at least partially included in the one or more subbands for uplink transmission and the one or more subbands for downlink reception for the at least one OFDM symbol.

The second PUCCH resource may be in slot symbols. The PUCCH configuration information may comprise a number of transmission repetitions. The PUCCH may be transmitted using a frequency domain resource allocation (FDRA). The DCI may indicate that the first PRI is for HARQ-ACK transmission. Determining the second PUCCH resource may comprise re-indexing PUCCH resources. Transmitting the PUCCH transmission may be in time units configured for SBFD.

In one or more cases, the WTRU may be configured to determine an explicit indication of resource allocations in SBFD symbols. A WTRU may be configured with one or more types of slots within a bandwidth, in which a first type of time instances (e.g., slot/symbol) may be used and/or determined for a first direction (e.g., downlink); a second type of time instances may be used and/or determined for a second direction (e.g., uplink); a third type of time instances may have a first group of frequency resources within the bandwidth for a first direction and a second group of frequency resources within the bandwidth for a second direction. The bandwidth may be interchangeably used with bandwidth part (BWP), carrier, subband, PRBs, and system bandwidth. The first type of time instances (e.g., the slot for a first direction) may be referred to as downlink time instances. The second type of time instances (e.g., slot for a second direction) may be referred to as uplink time instances. The third type of time instances may be referred to as sub-band non-overlapping full duplex (SBFD) time instances. The group of frequency resource for a first direction may be referred to as downlink subband, downlink frequency resource, and/or downlink RBs. The group of frequency resource for a second direction may be referred to as uplink subband, uplink frequency resource, and/or uplink RBs.

A WTRU may be configured with one or more PUCCH resource sets (e.g., up to 4 PUCCH resource sets), in which each PUCCH resource set may include one or more PUCCH resources (e.g., up to 32 PUCCH resources). The WTRU may receive PUCCH configuration information. Each PUCCH resource may be configured with PUCCH resource ID, starting PRB, Intra-slot hopping ON/OFF, and PUCCH format. Based on PUCCH format, a WTRU may be configured to determine the number of symbols, and maximum number of RBs.

In one or more cases, a WTRU may be configured with one or more PUCCH resource sets for an uplink-only time instance (e.g., TDD legacy UL-only symbol and/or slot). The WTRU may be configured to use the configured PUCCH resources for a SBFD time instance (e.g., symbol and/or slot), in which the number of RBs for uplink in a SBFD may be smaller than the number of RBs for uplink in an uplink-only time instance. For example, a WTRU may be configured to use all RBs in a BWP for uplink in an uplink slot while a subset of RBs in a BWP may be used for uplink in a SBFD slot.

Figure 5:
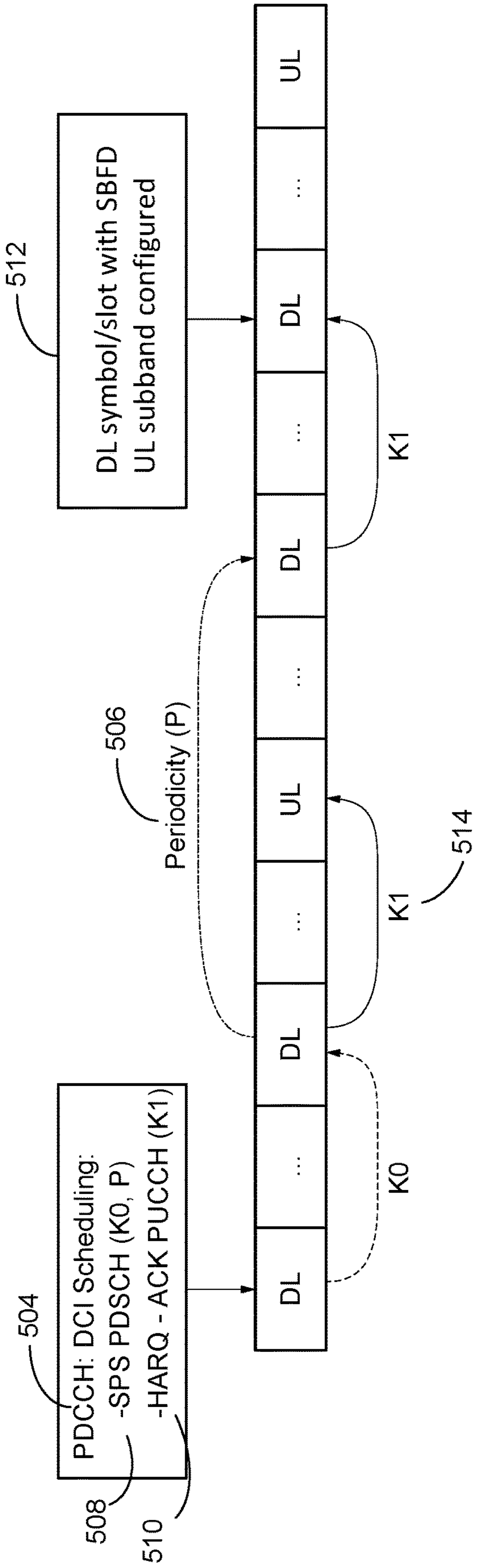
FIG. 5 is an example PUCCH configured in an example downlink (DL) time instance with an example configured SBFD.

As illustrated in FIG. 5, the WTRU may determine if an SBFD subband is configured and/or applies to the at least one DL time unit and if the PUCCH resource is within the SFBD subband.

In one or more cases, WTRU may modify the location of a resource and/or may receive an indication (e.g., via DCI, MAC-CE and/or RRC signaling) which may indicate to modify the location of the resource (e.g., PUCCH and/or PUSCH resource) and in which modification may include changing and/or shifting the starting PRB (e.g., by an offset) and/or changing the number of PRBs. Modification applies in one or more SBFD enabled time instances.

In one or more cases, the WTRU may be configured to re-interpret and/or re-index. The WTRU may perform re-interpreting and/or re-indexing of the configured resources based on PRB-shifting offsets received as part of SBFD configuration (e.g., group-common configs, RRC/MAC-CE/DCI configuration). The WTRU may receive one or more frequency offset values in addition to one or more flag indications allowing such re-interpretation (e.g., enabled/disabled).

The PRB indexes provided for the downlink and/or uplink resources in frequency domain may be partially and/or totally mapped to the PRBs outside of the boundaries of the downlink and/or uplink subband and/or PRBs and/or BWP in a SBFD configuration, respectively. As such, the WTRU may determine to use a provided and/or configured offset value to be added to and/or subtracted from the configured UL and/or DL PRB indexes, such that the new PRB indexes are mapped within the SBFD UL and/or DL boundaries, PRBs, BWP, and/or subband, respectively. In an example, the WTRU may be provided and/or be configured with a flag indication to add and/or subtract the configured offset value based on the preceding and/or succeeding, respectively, location of the configured UL and/or DL PRB indexes with respect to corresponding PRBs, BWP, and/or subband in the SBFD time instance. In another example, the WTRU may be provided and/or be configured with a positive and/or negative offset value on the preceding and/or succeeding, respectively, location of the configured UL and/or DL PRB indexes with respect to corresponding PRBs, BWP, subband in the SBFD time instance.

In one or more cases, the WTRU may be configured to determine an association of the starting RBs. The starting RB index of a PUCCH resource in an uplink slot may be associated with a starting RB index within uplink subband in a SBFD slot and/or symbol. Moreover, starting RB index of an SPS PDSCH 508 resource may be associated with a configured RB index within downlink subband in a SBFD time instance. The WTRU may receive the indication for associated starting RB index as part of SBFD configuration (e.g., group-common configs, and/or RRC/MAC-CE/DCI configuration). Alternatively, the WTRU may receive the indication for associated starting RB index as part of PUCCH resources indication (e.g., via activating DCI). As such, the WTRU may determine the RB index to be used for the UL transmission and/or DL reception within SBFD ULsubband 512 and/or DL subband based on the associated starting RB index, in which the starting RB index within respective SBFD subband (e.g., for the PUCCH resource) may be determined as a function of number of RBs ($N_{b,SFBD}$) in uplink subband in SBFD slot; number of RBs ($N_{b,UL}$) in uplink slot; and starting RB index in uplink slot.

The second PUCCH resource may be in slot symbols. The PUCCH configuration information may comprise a number of transmission repetitions. The PUCCH may be transmitted using a frequency domain resource allocation (FDRA). The DCI may indicate that the first PRI is for HARQ-ACK transmission. Determining the second PUCCH resource may comprise re-indexing PUCCH resources. Transmitting the PUCCH transmission may be in time units configured for SBFD.

In one or more cases, the WTRU may be configured to determine alternative resources. One or more PUCCH resources (e.g., valid PUCCH resources) located within uplink subband in SFBD slot may be used and other PUCCH resources (e.g., invalid PUCCH resources) which may be located outside the uplink subband in SBFD slot may be considered as not available PUCCH resources. When a WTRU is indicated to use an invalid PUCCH resource in a SFBD slot, the WTRU may and/or may be allowed to drop the PUCCH transmission. When a WTRU is indicated to use an invalid PUCCH resource in a SFBD slot, the WTRU may use the PUCCH resource in the closest and/or most recent uplink-only time instance in a future time instance. When a WTRU is indicated to use an invalid PUCCH resource in a SFBD slot, the WTRU may transmit PUCCH in a default PUCCH resource, in which the default PUCCH resource may be a pre-configured (or determined) PUCCH resource in a SFBD slot. PUCCH resource index may be re-ordered, re-indexed, and/or re-indicated for the valid PUCCH resources in a SBFD slot. The WTRU may be configured with a “SBFD-specific” PUCCH resource indicator to be used in case SBFD is enabled and original PUCCH resources are invalid. For example, the WTRU may determine that one or more PUCCH resources in a SBFD time instance are invalid. As such, the WTRU may determine to use the “SBFD-specific” configured PUCCH resources.

In one or more cases, the WTRU may be configured to determine an association of the PRIs. The WTRU may be configured with a first set of (e.g., up to 8) PUCCH resources. The WTRU may be configured and/or receive a PUCCH resource indicator (PRI), as part of scheduling and/or activating DCI, that may indicate the PUCCH resource to be used for PUCCH transmission. In one or more cases, the first set of PUCCH resources may be configured for the case in which WTRU is scheduled in an UL-only time instance, in which there may be a second set of PUCCH resources that are associated with the PUCCH resources in the first set. As such, if the WTRU is scheduled for PUCCH transmission in an UL-only time instance, the WTRU may use the PRI to map the PUCCH transmission based on the first set of PUCCH resources. However, if the WTRU is scheduled for PUCCH transmission in the UL subband 512 of a SBFD time instance, the WTRU may use the PRI to map the PUCCH transmission based on the associated second set of PUCCH resources. In an example, while the set of PUCCH resources may include up to (e.g., eight (8)) PUCCH resources, in this mode of operation, for the (e.g., 3-bit PRI), up to (e.g., sixteen (16)) PUCCH resources (e.g., two PUCCH resource sets) may be configured, in which the PUCCH resources in the first set are associated with the PUCCH resources in the second set.

In one or more cases, a WTRU may be configured with a first group of PUCCH resource sets which may be associated with a first type of time resources (e.g., uplink slot) and a second group of PUCCH resource sets which may be associated with a second type of time resources (e.g., SBFD slot). The starting RB of a PUCCH resource within the first group of PUCCH resource sets may be based on the RB index of the BWP, while the starting RB of a PUCCH resource within the second group of PUCCH resource sets may be based on the RB index within UL subband. A WTRU may be indicated (e.g., in DCI) whether a PUCCH resource in the second group of PUCCH resource sets may be allowed to use and/or not. If it is indicated that one or more PUCCH resources in the second group of PUCCH resource sets are not allowed to use, a WTRU may consider the one or more PUCCH resources as available resource for other transmission (e.g., PUSCH).

In one or more cases, the WTRU may be configured for independent/separate PUCCH configurations for SBFD and/or non-SBFD Tx/Rx occasions. In one or more cases, the WTRU may be configured to determine a PUCCH configuration applicable to SBFD. In some solutions, the WTRU may receive first and second PUCCH configuration such as PUCCH-Config provided by dedicated RRC signaling and/or PUCCH-ConfigCommon provided by system information and/or dedicated RRC signaling. The WTRU may first determine whether to transmit a PUCCH resource from first and/or second PUCCH configurations based on one of the following. The WTRU may determine the applicable PUCCH configuration based on a type of slot as described in the above. For example, the WTRU may transmit a PUCCH resource from first PUCCH configuration in case the type of slot is "uplink" and from second PUCCH configuration in case the type of slot is "SBFD". The WTRU may determine the applicable PUCCH configuration based on the timing of the slot in terms of slot index and/or system frame number. For example, the WTRU may receive RRC configuration of a first (or second) set of slots applicable to first (or second) PUCCH configuration. The first (or second) set of slots may be identified by a periodicity 506 and offset, and/or by a bitmap in which each bit position represents a slot.

The WTRU may determine the applicable PUCCH configuration based on implicit and/or explicit indication and/or configuration. The WTRU may receive PUCCH configuration information. For example, the WTRU may receive an indication from a field of a DCI of whether to use first and/or second PUCCH configuration. In another example, the WTRU may determine the PUCCH configuration based on the Coreset, search space and/or RNTI used for decoding a corresponding PDCCH 504.

In one or more cases, the WTRU may then determine a PUCCH resource from the first and/or second PUCCH configuration based on at least one of the following solutions. For example, the WTRU may be configured to determine a resource for HARQ-ACK 510. In one or more cases, the WTRU may receive configuration and/or indication of the PUCCH resource according to a legacy solution applied for the PUCCH configuration determined in first step. For example, the WTRU may receive a PRI from a field of DCI and determine the applicable PUCCH resource from a set of PUCCH resources configured as part of the determined PUCCH configuration. Such solution may also be applicable in case of PUCCH repetitions. In such case, the WTRU may determine the PUCCH resource applicable to a PUCCH repetition from the PUCCH configuration applicable to the slot in which the PUCCH repetition takes place and the indicated PRI. This allows determination of different PUCCH resources for different PUCCH repetitions. In another example, in case of PUCCH carrying HARQ-ACK 510 for SPS PDSCH 508 only, the WTRU may select a PUCCH resource from a set (sps-PUCCH-AN-List) configured in the determined PUCCH configuration.

In another example, the WTRU may be configured to determine a resource for Periodic CSI, SR, and/or SPS HARQ-ACK 510. In one or more cases, the WTRU may receive configuration and/or indication of first and second PUCCH resources applicable to first and second PUCCH configurations, respectively. For example, the WTRU may receive configuration of first and second PUCCH resource identifier in a periodic CSI reporting configuration for transmission of periodic CSI, in a scheduling request (SR) resource configuration for transmission of SR, and/or in a SPS configuration for transmission of HARQ-ACK 510 for SPS. The WTRU may transmit the periodic CSI report, SR and/or HARQ-ACK 510 in first (or second) configured PUCCH resource of first (or second) PUCCH configuration if it determines that PUCCH is to be transmitted from first (second) PUCCH configuration. In another example, the WTRU may be configured to determine other channels. In this case, the number and/or length of PRBs, subbands, and/or BWP configured for UL-only time instance may span larger subband, PRBs, and/or BWP than the uplink subband, PRBs, and/or BWP in SBFD time instance. For example, all RBs in a BWP may be used for uplink in an uplink-only slot and/or symbol while a subset of RBs in a BWP may be used for uplink in a SBFD slot and/or symbol.

In one or more cases, a WTRU may be configured with a downlink transmission in a downlink time instance, in which one or more UL SBFD subbands, BWPs, and/or PRBs may be enabled and/or disabled. Alternatively, the WTRU may be configured with a DL transmission in an UL time instance (e.g., time unit), in which one or more DL SBFD subbands and/or BWPs PRBs may be enabled and/or disabled.

Moreover, the WTRU may be configured with one or more SPS PDSCH 508 resources for one or more DL-only time instances (e.g., TDD legacy DL-only), and the configured PDSCH resources may be used for an SBFD configured time instance. In an example, the SBFD may be configured for one or more uplink PRBs, BWPs, and/or subbands in a legacy DL time instance, in which the remaining PRBs, BWPs, and/or subbands may be used for DL. Alternatively, the SBFD may be configured for one or more downlink PRBs, BWPs, and/or subbands in a (e.g., legacy) uplink-only time instance, in which the remaining PRBs, BWPs, and/or subbands will be used for UL. In this case, the number and/or length of PRBs, subbands, and/or BWP configured for DL-only time instance may span larger subbands, PRBs, and/or BWPs than the downlink subband, PRB, and/or BWP in SBFD time instance. For example, all RBs in a BWP may be used for DL in a DL-only slot/symbol while a subset of RBs in a BWP may be used for DL in a SBFD slot and/or symbol.

In one or more cases, the WTRU may be configured to determine PUCCH resources to support repetition. In one or more cases, the WTRU may be configured to determine an indication of associated PUCCH resources to support PUCCH repetitions. A WTRU configured to transmit PUCCH repetitions may determine the PUCCH resource applicable to each repetition using the following solution. The WTRU may receive, for each PUCCH resource in first (second) PUCCH configuration. In one or more cases, the configuration may include the following: number of repetitions applicable when the PUCCH resource is indicated (e.g., by PRI); and an indication of an associated PUCCH resource in the other PUCCH configuration (e.g., from the second (or first) PUCCH configuration) applicable for a PUCCH repetition in a slot where the other PUCCH configuration is applicable.

The WTRU may then determine a reference PUCCH resource from the first and/or second PUCCH configuration based on the indicated PRI. The WTRU may either select the PUCCH configuration based on a fixed rule (e.g., always first configuration) and/or based on the applicable PUCCH configuration for the slot in which the initial PUCCH repetition takes place. The WTRU may then determine the number of PUCCH repetitions and an associated PUCCH resource from the configuration provided for the reference PUCCH resource. For each PUCCH repetition, the WTRU selects either the reference PUCCH resource and/or the associated PUCCH resource according to the PUCCH configuration applicable to the slot in which the PUCCH repetition takes place.

A second rule may comprise applying a frequency offset to the first PUCCH resource. The second rule may comprise applying a different mapping for the first PRI to PUCCH resources for transmissions associated with the SFBD configuration information and the first PRI. The second rule may map the first PRI to a second PRI. The second PRI may be used for determining the second PUCCH resource. The second PRI may be used for SBFD uplink transmissions based on an association with non-SBFD PRIs.

In one or more cases, a WTRU may be indicated PUCCH resource index (PRI) with its associated reporting timing in an associated DCI (e.g., scheduling DCI for PDSCH), in which the PRI may be interpreted differently based on the associated slot type. For example, PRI may indicate one of PUCCH resources within a PUCCH resource set if the PRI is associated with a first type of slot (e.g., uplink slot); while the PRI may indicate which RB(s) in an SBFD slot are determined as an uplink subband when the PRI is associated with a second type of slot (e.g., SBFD slot), in which a predetermined PUCCH resource within the uplink subband may be used for PUCCH transmission.

In one or more cases, the WTRU may be configured to determine an implicit indication of resource allocations in SBFD symbols. In case the WTRU is not configured with (dedicated) PUCCH resource configuration, the WTRU may use a default PUCCH setting (e.g., received in system information such as in pucch-ResourceCommon). In an example, the default PUCCH setting may include parameters for transmission of one or more control information (e.g., HARQ-ACK 510) in an (e.g., an initial) uplink BWP. For example, the default PUCCH setting may indicate parameters such as PUCCH format, first symbol, number of symbols, PRB offset, set of initial cyclic shift indexes, and so forth. As such, the WTRU may be configured to determine whether/how to implicitly indicate frequency/PRB resources for transmission in SBFD UL subbands 512.

A WTRU may be configured with respective uplink transmission in a time instance, in which SBFD configuration is enabled (e.g., via flag indication). The SBFD configuration may include time and frequency domain configurations for the UL subbands/frequencies/PRBs that may be located within/as part of a TDD downlink and/or flexible time instance (e.g., configured via tdd-UL-DL-ConfigurationCommon, tdd-UL-DL-ConfigurationDedicated, and so forth).

In one or more cases, a WTRU may determine that the frequency-domain resources for an UL transmission in an SBFD time instance is out of the SBFD's uplink frequency/subband/PRBs' boundaries. In an example, the WTRU may determine that a configured PRI for a PUCCH transmission is not located within the boundaries of respective SBFD's uplink frequency/BWP/subband/PRBs. The WTRU may determine if the WTRU is provided with one or more values to determine the resource locations explicitly for respective UL transmission within SBFD resources (e.g., frequency shift, re-indexing of PRB IDs, indication for a PRI that is within the SBFD UL subbands 512 boundaries, and so forth).

In one or more cases, the WTRU may determine to implicitly define the frequency-domain resources (e.g., PRBs) for respective uplink transmission that is within the SBFD UL subbands 512 boundaries. In an example, the WTRU may determine to use one or more default settings for frequency-domain resources for respective uplink transmission. The WTRU may be configured with a flag indication to enable/disable implicit determination of PRBs/frequency-domain resources.

In an example, a WTRU may determine that for a PUCCH transmission, the configured PRI is mapped to PRBs/subbands that are out of the SBFD UL subband 512/PRB boundaries. As such, the WTRU may determine to use the (default) PUCCH settings/configurations that is for example configured for PUCCH resource allocations before dedicated PUCCH resources are configured (e.g., pucch-ResourceCommon). In that case, the WTRU may determine to reinterpret/re-index the (default) PUCCH settings/configurations in order to accommodate the frequency/subband/PRB allocations within the SBFD UL subband 512/PRB boundaries. For instance, the WTRU may consider the PRB offset/starting PRB configured in (default) PUCCH setting/configuration with respect to the SBFD UL subband 512/PRB boundaries.

In an example, the WTRU may be configured with SBFD in a time instance, in which the starting PRB corresponding to the SBFD's subband/PRBs/BWP may be indicated by a PRB index N1, and the last PRB corresponding to the SBFD's subband/PRBs/BWP may be indicated by a PRB index N2. As such, the WTRU may consider the PRB offset/starting PRB configured in (default) PUCCH setting/configuration with respect to the SBFD UL starting PRB index N1. For example, if the PRB offset/starting PRB indicates 0 and/or 4, the WTRU may consider respective PRB index as N1 and/or N1+4, respectively.

In one or more cases, a WTRU may determine that for determination of PRBs/frequency-domain resources in an SBFD UL subband 512/PRB/BWP, the WTRU is neither provided with explicit indications nor with implicit indications (e.g., implicit indication is not allowed based on enable/disable flag). As such, the WTRU may determine to skip uplink transmission in respective SBFD UL subbands/PRBs. The WTRU may determine to use an earliest UL SB/slot for respective uplink transmission (e.g., for PUCCH transmission corresponding to a SPS PDSCH 508 configuration).

In one or more cases, the WTRU may be configured to determine a reliability of resource allocations in SBFD symbols. A WTRU may receive and/or be configured with one or more SPS (Semi-Persistent Scheduling) configurations in a BWP (e.g., via sps-Config and/or sps-ConfigToAddModList), in which the SPS configuration may include periodicity of transmission, PDSCH aggregation factor, and so forth. The WTRU may receive a DCI (e.g., format 1_1 and/or 1_2) that may activate one or more SPS transmissions (e.g., CRC scrambled with CS-RNTI), in which the DCI may include time and frequency configurations for respective PDSCH transmission. In an example, the WTRU may receive the time and resources for respective PUCCH transmissions, including HARQ-ACK 510 transmission (e.g., K1 514) and process ID.

Upon reception of a first DL (e.g., PDSCH), the WTRU may perform a first uplink (e.g., PUCCH, PUSCH) transmissions on a SBFD UL subband 512. The WTRU may further monitor, detect, and/or receive a second DL reception (e.g., SPS PDSCH 508 corresponding to the first configured DL, and/or PDCCH 504 scheduling a new grant). Based on the second received DL, the WTRU may determine if it indicates/confirms that the first transmitted UL is received (e.g., at a gNB). In case no confirmation is received, the WTRU may determine (e.g., for reliability purposes) to re-transmit the UL (e.g., PUCCH/HARQ-ACK 510). In an example, the WTRU may determine to retransmit the PUCCH/HARQ-ACK 510 in the uplink-only time instance which is the most recent after respective time instance (e.g., indicated by K1 514). This behavior may be configurable (e.g., by gNB), via different configurations.

In one or more cases, a WTRU may receive at least one configuration (e.g., mode, operation, behavior, operation mode, and/or the like) for UL transmission behavior in a SBFD slot (or symbol) of the following. For example, the WTRU may be configured for one time transmission. In another example, the WTRU may be configured for a conditional fallback transmission. In another example, the WTRU may be configured for a conditional repetition-based transmission.

With respect to a one time transmission configuration, for a scheduled/indicated UL (e.g., PUCCH, PUSCH, SRS, PRACH, etc.) transmission, a WTRU may perform the UL transmission once on a valid/indicated slot (or symbol(s)) which may be a SBFD slot/symbol, a 'Flexible' slot/symbol, and/or an 'Uplink' slot/symbol, based on an indicated parameter for the valid slot (e.g., a K1 514 value indicated by a DCI). In an example, the UL transmission may comprise a PUCCH transmission. The PUCCH transmission may be performed in response to receiving a DL-grant for scheduling a DL reception (e.g., PDSCH). The DL-grant may indicate a value (e.g., K1 514) which may indicate (e.g., point to) an SBFD slot (or symbol), e.g., within and/or in a legacy 'Downlink' slot configured/indicated separately (e.g., by a tdd-UL-DL-config parameter configuring a slot/symbol-level time-domain pattern based on 'D', 'F', 'U', and/or by a slot-format-indicator (SFI) indicating a symbol-level time-domain pattern based on 'D', 'F', 'U' via a DCI). In response to determining the K1 514 value indicating (e.g., pointing to) one among the SBFD slot (or symbol), the 'F' slot (or symbol), and the 'U' slot (or symbol), the WTRU may perform the PUCCH transmission (once, e.g., one time) on the time instance indicated by the K1 514 value.

In an example, the WTRU may determine that the indicated slot (or symbol) by the K1 514 value is an SBFD slot (or symbol). In response to the determining, the WTRU may perform the PUCCH transmission (once, e.g., one time) on the indicated SBFD slot (or symbol) by the K1 514 value, in which the WTRU may identify/determine an SBFD slot (or symbol) indicated by the K1 514 value is a valid UL transmission timing even though the SBFD slot is comprised in a legacy 'D' slot being configured/indicated separately. This may provide benefits in terms of latency reduction of the UL transmission which may be performed earlier than on a legacy UL-only time instance, in which the latency reduction of the UL transmission may further improve an overall system latency performance (e.g., for a latency-sensitive use case such as URLLC) of a communication system, comprising both DL and UL, being considered.

In an example, the WTRU may determine that the indicated slot (or symbol) by the K1 514 value is a 'Flexible (F)' slot (or symbol). In response to the determining, the WTRU may perform the PUCCH transmission (once, e.g., one time) on the indicated 'F' slot (or symbol) by the K1 514 value.

In an example, the WTRU may determine that the indicated slot (or symbol) by the K1 514 value is an 'Uplink (U)' slot (or symbol). In response to the determining, the WTRU may perform the PUCCH transmission (once, e.g., one time) on the indicated 'U' slot (or symbol) by the K1 514 value.

With respect to a conditional fallback transmission configuration, for a scheduled/indicated UL (e.g., PUCCH, PUSCH, SRS, and/or PRACH, etc.) transmission to be performed on a first time-instance, a WTRU may determine that, based on one or more pre-defined and/or pre-configured conditions being met, the UL transmission is not to be performed and is to be fallback to be performed on a second time instance.

In an example, the UL transmission may comprise a PUCCH transmission. The PUCCH transmission may be performed in response to receiving a DL-grant for scheduling a DL reception (e.g., PDSCH). The DL-grant may indicate a K1 514 value which may indicate (e.g., point to) an SBFD slot (or symbol), e.g., within and/or in a Downlink-only time instance configured/indicated separately (e.g., by a tdd-UL-DL-config parameter configuring a slot/symbol-level time-domain pattern based on 'D', 'F', 'U', and/or by a slot-format-indicator (SFI) indicating a symbol-level time-domain pattern based on 'D', 'F', 'U' via a DCI). The WTRU may determine that the first time-instance, indicated by the K1 514 value is an SBFD slot (or symbol). The WTRU may further determine that the one or more conditions are met on the first time-instance, and based on that, the WTRU may determine the UL transmission is to be fallback to be performed on a second time instance. In an example, the second time instance may be a (legacy) UL-only and/or flexible time instance.

In an example, the second time instance may be the most recent (legacy) UL-only time instance after the first time-instance (e.g., the slot/symbol indicated by the K1 514). In an example, the second time instance may be the most recent (legacy) Flexible time instance after the first time-instance (e.g., the slot/symbol indicated by the K1 514).

In one or more cases, the "conditional fallback transmission" (e.g., Configuration 2) may be applied in association and/or along with the "one time transmission" (e.g., Configuration 1), in which the WTRU may determine the mode of operation (e.g., based on Configuration 1 and/or Configuration 2) based on one or more conditions. The WTRU may determine Configuration 2 instead of Configuration 1 if one or more of the following conditions apply. For example, if a scheduled/configured/indicated frequency-domain resource (e.g., a set of PRBs) of the UL (e.g., PUCCH) transmission is not (fully) comprised/included within an uplink subband on a SBFD slot/symbol, in which the SBFD slot/symbol comprises (or is determined based on) the first time-instance. In another example, if a scheduled/configured/indicated frequency-domain resource (e.g., a set of PRBs) of the UL (e.g., PUCCH) transmission is not at least partially comprised/included within an uplink subband on a SBFD slot/symbol, in which the SBFD slot/symbol comprises (or is determined based on) the first time-instance. In another example, conditional fallback transmission may apply if none of the above-mentioned explicit-implicit indications may apply.

With respect to a conditional repetition-based transmission configuration, for a scheduled/indicated UL (e.g., PUCCH, PUSCH, SRS, PRACH, etc.) transmission, a WTRU may perform the UL transmission at least once on a valid/indicated slot (or symbol(s)), e.g., a first time instance, which may be a SBFD slot/symbol, a 'Flexible' slot/symbol, and/or an 'Uplink' slot/symbol, based on an indicated parameter for the valid slot (e.g., a K1 514 value indicated by a DCI), and if applicable, the WTRU may perform the UL transmission again on a second time instance. This may provide benefits in terms of reliability and robustness in the considered communication system.

In an example, the UL transmission may comprise a PUCCH transmission. The PUCCH transmission may be performed in response to receiving a DL-grant for scheduling a DL reception (e.g., PDSCH). The DL-grant may indicate a K1 514 value which may indicate (e.g., point to)

an SBFD slot (or symbol), e.g., within and/or in a 'Downlink-only' time instance configured/indicated separately (e.g., by a tdd-UL-DL-config parameter configuring a slot/symbol-level time-domain pattern based on 'D', 'F', 'U', and/or by a slot-format-indicator (SFI) indicating a symbol-level time-domain pattern based on 'D', 'F', 'U' via a DCI).

In one or more cases, the WTRU may determine that the first time-instance (e.g., indicated by the K1 514 value) is an SBFD slot (or symbol). As such, the WTRU may determine to perform the UL re-transmission on a second time-instance (which may be later than the first time-instance). The WTRU may be configured with a flag indication to enable/disable retransmission in a second time-instance. The WTRU may be explicitly configured with the second time-instance, and/or the WTRU may implicitly determine the second time-instance. In an example, the second time instance may be a (legacy) 'Uplink-only' (or 'F') slot (or symbol). In an example, the second time instance may be the most recent (legacy) 'Uplink-only' slot (or symbol) after the first time-instance (e.g., the slot/symbol indicated by the K1 514). In an example, the second time instance may be the most recent (legacy) 'F' slot (or symbol) after the first time-instance (e.g., the slot/symbol indicated by the K1 514). If the UL transmission is based on a configuration for Tx repetition (e.g., slot-level repetition, intra-slot repetition, etc.), the WTRU may perform the UL transmission repeatedly after the second time instance, based on the configuration for Tx repetition.

In one or more cases, a WTRU may monitor, detect, and/or receive a PDCCH scheduling 504 a new grant, upon a UL transmission in SBFD UL subband 512. When the WTRU (successfully) receives the PDCCH, e.g., within a pre-defined and/or pre-configured time window, the WTRU may identify/determine that it (e.g., the PDCCH 504) is as an acknowledgement of the reception (at gNB) of the UL transmission. Based on the identifying/determining, the WTRU may determine not to apply a conditional fallback Tx (e.g., based on a conditional fallback transmission configuration) and/or a conditional repetition-based Tx (e.g., based on a conditional repetition-based transmission configuration).

In one or more cases, a WTRU may be configured to determine enhancements for multiple transmissions (e.g., repetitions) in SBFD framework. A WTRU may be configured to perform Tx/Rx repetitions, for instance to enhance the Tx/Rx coverage. For example, the WTRU may use multi-slot PUSCH/PUCCH transmissions and/or multi-slot PDSCH/PDCCH 504 receptions. In a TDD framework with SBFD configurations enabled, the multi-slot UL transmission and/or DL receptions may span SBFD slots/symbols/time instances, as well as legacy UL-only and DL-only time instances, respectively. As such, the WTRU may be configured to determine whether/how to perform (multi-slot) UL/DL repetitions, in which the repetition instances may span both SBFD and UL-only/DL-only time instances.

In one or more cases, a WTRU may be configured for multiple UL transmissions (e.g., repetitions). The WTRU may be configured to, may be indicated to, and/or may receive configuration information indicating to, perform PUCCH and/or PUSCH repetitions. The number of PUCCH repetitions may be indicated as part of a configuration (e.g., a configuration of a PUCCH format and/or a PUCCH resource) that the WTRU may receive (e.g., from a gNB).

A WTRU may be configured to, may be indicated to, and/or may receive configuration information indicating to, transmit repetitions (e.g., PUCCH repetitions) using "available slot counting". If a WTRU is configured and/or indicated to transmit N repetitions, the skipped repetitions may not be counted so the actual repetitions transmitted is N. In another example, skipped and/or dropped repetitions may be counted so the actual number of repetitions may be less than N.

When SBFD applies (e.g., in one or more time-units such as one or more symbols and/or slots), the WTRU may perform UL repetitions such as PUSCH and/or PUCCH repetitions using at least one of the following solutions. PUSCH and/or PUCCH may be used as a non limiting example of an UL transmission. Another transmission may be used and still be consistent with this disclosure.

In one or more cases, the WTRU may determine that the set of PUSCH (or PUCCH) repetitions occurs only in slots of the same type as the slot in which the first and/or initial transmission occurs. For example, in case the first PUCCH transmission occurs in a SBFD slot, subsequent PUCCH repetitions may (or may only) occur in SBFD slots and not in UL-only time instances/slots. Conversely, in case the first PUCCH transmission occurs in an UL-only time instance, subsequent PUCCH repetitions may (or may only) occur in UL-only time instances (or flexible time instances) and not in SBFD time instances. The WTRU may send the first PUCCH transmission using a time division duplex (TDD) configuration. In case of PUCCH repetitions in which "available slot counting" is not configured, the WTRU may drop PUCCH repetitions overlapping with SBFD slots. Optionally, such solution may be applicable only for the case in which the initial transmission occurs in an UL-only time instance.

In one or more cases, the WTRU may determine that a PUSCH (or PUCCH) transmission and/or repetition is performed in an SBFD time instance under a condition that the frequency allocation of the PUSCH (or PUCCH) fully overlaps or is contained within the subband available for uplink transmission in the SBFD slot. The WTRU may make this determination under a condition that it received indication (e.g., by DCI and/or MAC CE) and/or configuration that such transmission is allowed.

A first and/or second PUCCH resource may be in slot symbols. The PUCCH configuration information may comprise a number of transmission repetitions. The PUCCH may be transmitted using a frequency domain resource allocation (FDRA). The DCI may indicate that the first PRI is for HARQ-ACK transmission. Determining the second PUCCH resource may comprise re-indexing PUCCH resources. Transmitting the PUCCH transmission may be in time units configured for SBFD.

The solutions described may be applicable to a set of PUCCH occasions and/or repetitions for PUCCH transmitted according to a PUCCH configuration.

In one or more cases, a WTRU may be configured for PUCCH repetition. A WTRU may be configured to perform UL transmissions based on PUCCH repetition, in which the PUCCH repetition may be time-domain-multiplexed (TDMed) repetitions, based on a higher-layer configure parameter, e.g., 'nrofSlots' indicating the number of repetitions (of a same PUCCH content/message).

In an example, the WTRU may be configured with a PUCCH resource in which one or more configuration parameters of the PUCCH resource may comprise a PUCCH-FormatConfig parameter which may comprise the parameter of 'nrofSlots'. In another example, the WTRU may be configured with a PUCCH resource in which one or more configuration parameters of the PUCCH resource may comprise, directly, a parameter indicating the number of repetitions, e.g., 'pucch-RepetitionNrofSlots'.

Upon receiving such configuration (e.g., with 'nrofSlots', 'pucch-RepetitionNrofSlots', and/or the like), the WTRU may identify/determine that the PUCCH resource carries uplink-control-information (UCI), and the same PUCCH resource in another one or more slots carries a repetition of the UCI, which are to be transmitted by the WTRU.

The WTRU may further be configured with a multi-TRP (mTRP) based repetition scheme (or mode of operation), and in that case, the WTRU may be configured with at least two spatial-domain parameters (e.g., each as a 'spatial-relation-Info', and/or an UL Transmission Configuration Indicator; UL-TCI, and/or a joint DL/UL TCI, etc.). Each of the spatial-domain parameters may be associated/used for each Tx (occasion) of the repeated UL transmissions. A spatial-domain parameter (e.g., of the at least two configured spatial-domain parameters) may comprise a source reference signal (RS) as a spatial-domain reference for WTRU to generate/determine a spatial-domain filter (or filter coefficient(s)) to be used for an UL transmission.

An issue/problem that may be resolved is, at least for such PUCCH repetitions being configured to the WTRU, if allowed in SBFD slot/symbol(s), a part of the PUCCH repetition-based transmission colludes with a DL reception in the SBFD slot/symbol(s).

In one or more cases, a WTRU may receive a configuration for PUCCH repetition, in which at least one symbol for the PUCCH repetition occurs (e.g., within one or more UL subbands) in one or more SBFD symbols (e.g., in 'D' symbols), and/or 'F' and/or 'U' symbols. The WTRU may receive a DL-grant/configuration/indication for receiving a DL signal (or channel) at least on an overlapping symbol of the one or more SBFD symbols. One or more of following may apply.

In a first example (e.g., operation mode 1), the WTRU may drop transmitting all the Tx occasions of the PUCCH repetition, and the WTRU may, instead, receive the DL signal (or channel). This may provide benefits in terms of low WTRU complexity and simplified operational behaviors in the communication system employing the SBFD operation.

In a second example, (e.g., operation mode 2), a WTRU may be configured for selective transmission. The WTRU may transmit one or more not-overlapped TX occasion(s) (of the PUCCH repetition), e.g., if no overlaps at all are found/determined in the time domain, and/or if up to X symbols are overlapped in which the value of X>0 may be pre-defined and/or pre-configured and/or indicated. The WTRU may drop transmitting other Tx occasion(s) of the PUCCH repetition being overlapped, and the WTRU may, instead, receive the DL signal (or channel) on the overlapped symbol(s). This may improve system throughput and operational efficiency/flexibility as this allows both DL and UL links to be used, at least with the not-overlapped symbol(s) being able to be transmitted as a part of the PUCCH repetition.

In some cases, the WTRU may be configured for PRI-codepoint wise configuration. The WTRU may transmit the PUCCH Tx occasion(s) (of the PUCCH repetition) using a PUCCH resource indicated by a codepoint of the PRI field in a DCI that has scheduled the DL signal (or channel) reception, in which the WTRU may be configured with the PUCCH resource to be used for SBFD slot/symbol which has a valid frequency resource allocation within the UL subband in the SBFD slot/symbol. The WTRU may be configured with a second PUCCH resource (e.g., mapped to a second codepoint in the same PRI field) to be used for (legacy) 'U' (or 'F') slot/symbol which may have a second frequency resource allocation not fully covered within the UL subband.

In some cases, the WTRU may be configured for Implicit interpretation of alternative resources. The WTRU may transmit the PUCCH Tx occasion(s) (of the PUCCH repetition) using a first set of frequency resource allocation parameters (e.g., one or more PRBs) configured for a PUCCH resource indicated by a codepoint of the PRI field in a DCI that has scheduled the DL signal (or channel) reception. The WTRU may be configured with the PUCCH resource comprising two different sets of frequency resource allocation parameters, e.g., the first set of frequency resource allocation parameters for SBFD slot/symbol (within the UL subband) and a second set of frequency resource allocation parameters for (legacy) 'U' (or 'F') slot/symbol (within a UL-BWP but maybe beyond and/or at least partly outside of the UL subband).

In some cases, the WTRU may be configured for Association of PUCCH resource indicators. The WTRU may transmit the PUCCH Tx occasion(s) (of the PUCCH repetition) using a PUCCH resource indicated by a codepoint of the PRI field in a DCI that has scheduled the DL signal (or channel) reception, in which the WTRU may be configured with the PUCCH resource to be used for SBFD slot/symbol which has a valid frequency resource allocation within the UL subband in the SBFD slot/symbol. The WTRU may be configured with a second PUCCH resource, which has an association/linkage with the PUCCH resource, e.g., by a higher-layer signaling such as RRC and/or MAC-CE) and is not mapped to any other codepoint in the same PRI field. If the WTRU identifies/determines to transmit a second PUCCH Tx occasion on a (legacy) 'U' (or 'F') slot/symbol in response to receiving the same codepoint of the PRI field, the WTRU may transmit the second PUCCH Tx occasion using the second PUCCH resource (associated/linked with the PUCCH resource) based on identifying and determining the association/linkage.

In some cases, the WTRU may be configured for Selective Transmission (based on TCI state). For instance, in an example 2A (e.g., operation mode 2A), the WTRU may transmit one or more TX occasion(s) (of the PUCCH repetition) being overlapped with the DL but a TCI (e.g., beam and/or time/frequency-domain channel large-scale property(es)/quasi-co-location(QCL)-type(s)) configured and/or indicated for the UL and DL being identical (or associated in a same set of TCIs), in which the WTRU may report its capability for such simultaneous Tx (e.g., as a part of the PUCCH repetition) and Rx (of the DL). The WTRU may report such a capability based on its supported/implemented capability for full-duplex operation (for the simultaneous Tx and Rx) at the WTRU.

In some cases, the WTRU may be configured for Selective Transmission (based on repetition pattern). For instance, in example 2B (e.g., operation mode 2B), the WTRU may transmit one or more TX occasion(s) (of the PUCCH repetition) being indicated with the same (or a pre-defined and/or pre-configured pattern of) spatial-relation-info (or UL-TCI and/or TCI) based on a configured repetition pattern (e.g., a 'cyclicMapping' and/or 'sequentialMapping') and being not overlapped with DL, e.g., if no overlaps at all are found/determined in the time domain, and/or if up to X symbols are overlapped in which the value of X>0 may be pre-defined and/or pre-configured and/or indicated. The 'cyclicMapping' pattern may imply a first Tx occasion to use a first TCI and a second Tx occasion to use a second TCI, and the pattern for these two occasions are to be repeated until the last Tx occasion being reached. The 'sequential-Mapping' pattern may imply a first Tx occasion to use a first TCI, a second Tx occasion to use the first TCI, a third Tx occasion to use a second TCI, a fourth Tx occasion to use the second TCI, and the pattern for these four occasions are to be repeated until the last Tx occasion being reached. The WTRU may drop transmitting other Tx occasion(s) of the PUCCH repetition being overlapped, and the WTRU may, instead, receive the DL signal (or channel) on the overlapped symbol(s). This may improve system throughput and operational efficiency/flexibility as this allows both DL and UL links to be used, at least with the not-overlapped symbol(s) being able to be transmitted as a part of the PUCCH repetition.

In some cases, the WTRU may be configured to determine that all Tx occasions of the PUCCH repetition overlap with the DL, the WTRU may conditionally, in response to the determining, perform the Example 1 (operation mode 1) as a fallback behavior.

In a third example, (e.g., operation mode 3), the WTRU may drop receiving the DL and transmit the UL (with repetition), unless the DL at least (partly) may comprise an SSB, a TRS, a special monitoring occasion (e.g., looking for random-access-response (RAR), beam-failure-recovery (BFR)-response, and/or a particularly configured/indicated DL signal/channel, etc.), in which for such special monitoring occasion cases, the WTRU may instead drop transmitting all UL Tx occasions and/or a part of the UL Tx occasions that have may overlap as such.

In one or more cases, a WTRU may be configured for PUCCH repetition. A WTRU may be configured to perform UL transmissions based on PUCCH repetition, in which the PUCCH repetition may be time-domain-multiplexed (TDMed) repetitions, based on a higher-layer configure parameter, e.g., 'numberOfRepetitions' indicating the number of repetitions (of a same PUCCH content/packet). In an example, the WTRU may be configured with the parameter (e.g., 'numberOfRepetitions') in a codepoint (or field state) of a time-domain-resource-assignment (TDRA) field in a UL-DCI (e.g., DCI format 0_1 and/or 0_2, etc.).

An issue/problem that may be resolved is, at least for such PUCCH repetitions being configured to the WTRU, if allowed in SBFD slot/symbol(s), a part of the PUCCH repetition-based transmission collides with a DL reception in the SBFD slot/symbol(s).

In one or more cases, a WTRU may receive a UL-grant/configuration/indication for PUCCH repetition, in which at least one symbol for the PUCCH repetition may comprise (within one or more UL subbands) in one or more SBFD symbols (e.g., in 'D' symbols), and/or 'F' and/or 'U' symbols. If the WTRU receives a DL-grant/configuration/indication for receiving a DL signal (or channel) at least on an overlapping symbol of the one or more SBFD symbols, one or more of the following examples (e.g., example 1, example 2, and example 3) apply. With respect to example 1 (e.g., operation mode 1), the WTRU may drop transmitting all the Tx occasions (e.g., for PUCCH repetition Type A) and/or all the actual repetitions (e.g., for PUCCH repetition Type B) of the PUCCH repetition, and the WTRU may, instead, receive the DL signal (or channel). This may provide benefits in terms of low WTRU complexity and simplified operational behaviors in the communication system employing the SBFD operation.

With respect to example 2 (e.g., operation mode 2), the WTRU may be configured for selective transmission. For instance, the WTRU may transmit one or more not-overlapped TX occasion(s) (of the PUCCH repetition), e.g., if no overlaps at all are found/determined in the time domain, or if up to Y symbols are overlapped in which the value of Y>0 may be pre-defined and/or pre-configured and/or indicated. The WTRU may drop transmitting other Tx occasion(s) of the PUCCH repetition being overlapped, and the WTRU may, instead, receive the DL signal (or channel) on the overlapped symbol(s). This may improve system throughput and operational efficiency/flexibility as this allows both DL and UL links to be used, at least with the not-overlapped symbol(s) being able to be transmitted as a part of the PUCCH repetition. The WTRU may be configured for selective transmission (based on a TCI state). For instance, in example 2A (e.g., operation mode 2A), the WTRU may transmit one or more TX occasion(s) (of the PUCCH repetition) being overlapped with the DL but a TCI (e.g., beam and/or time/frequency-domain channel large-scale property(es)/quasi-co-location (QCL)-type(s)) configured and/or indicated for the UL and DL being identical (or associated in a same set of TCIs), in which the WTRU may report its capability for such simultaneous Tx (e.g., as a part of the PUCCH repetition) and Rx (of the DL). The WTRU may report such a capability based on its supported/implemented capability for full-duplex operation (for the simultaneous Tx and Rx) at the WTRU. In an example, the WTRU may transmit one or more TX occasion(s) (of the PUCCH repetition) being overlapped with the DL but a first WTRU-panel to be used for the Tx and a second UL-panel to be used for the DL, in which the WTRU may report its capability for such simultaneous Tx (e.g., as a part of the PUCCH repetition) and Rx (of the DL) over at least two different WTRU-panel (or antenna group and/or different Tx/Rx (hardware) entities, etc.). The WTRU may report such a capability based on its supported/implemented capability for full-duplex operation (for the simultaneous Tx and Rx) at the WTRU. The WTRU may be configured for selective transmission (based on a repetition pattern). For instance, in example 2B (e.g., operation mode 2B), the WTRU may transmit one or more TX occasion(s) (of the PUCCH repetition) being indicated with the same (or a pre-defined and/or pre-configured pattern of) spatial-relation-info (or UL-TCI and/or TCI) based on a configured repetition pattern (e.g., a 'cyclic-Mapping' and/or 'sequentialMapping') and being not overlapped with DL, e.g., if no overlaps at all are found/determined in the time domain, and/or if up to Y symbols are overlapped in which the value of Y>0 may be pre-defined and/or pre-configured and/or indicated. The 'cyclicMapping' pattern may imply a first Tx occasion to use a first TCI and a second Tx occasion to use a second TCI, and the pattern for these two occasions are to be repeated until the last Tx occasion being reached. The 'sequentialMapping' pattern may imply a first Tx occasion to use a first TCI, a second Tx occasion to use the first TCI, a third Tx occasion to use a second TCI, a fourth Tx occasion to use the second TCI, and the pattern for these four occasions are to be repeated until the last Tx occasion being reached. The WTRU may drop transmitting other Tx occasion(s) of the PUCCH repetition being overlapped, and the WTRU may, instead, receive the DL signal (or channel) on the overlapped symbol(s). This may improve system throughput and operational efficiency/flexibility as this allows both DL and UL links to be used, at least with the not-overlapped symbol(s) being able to be transmitted as a part of the PUCCH repetition.

In one or more cases with respect to example 2, a WTRU may be configured for alternative FDRA. The WTRU may (be configured to) use a different frequency-domain-resource-allocation to transmit one or more TX occasion(s) (of the PUCCH repetition), if such overlap to DL is detected, identified, and/or determined at the WTRU, instead of dropping the transmission. For this purpose, the WTRU may receive a configuration/indication of the different frequency-domain-resource-allocation (e.g., a set of PRBs) to be used for the transmission.

If the WTRU determines that all Tx occasions of the PUCCH repetition overlap with the DL, the WTRU may conditionally, in response to the determining, perform the Example 1 (operation mode 1) as a fallback behavior.

In one or more cases with respect to example 3 (e.g., operation mode 3), a WTRU may be configured to drop receiving the DL and transmit the UL (with repetition), unless the DL at least (partly) comprises an SSB, a TRS, a special monitoring occasion (e.g., looking for random-access-response (RAR), beam-failure-recovery(BFR)-response, and/or a particularly configured/indicated DL signal/channel, etc.), in which for such special monitoring occasion cases, the WTRU may instead drop transmitting all UL Tx occasions and/or a part of the UL Tx occasions that have may overlap as such.

In one or more cases, a WTRU may be configured for PDCCH repetition. A WTRU may be configured to perform DL receptions based on PDCCH repetition, in which the PDCCH repetition may be time-domain-multiplexed (TDMed) repetitions, based on a higher-layer configure parameter, e.g., 'searchSpaceLinking' indicating two linked search spaces (e.g., to be associated with a search space set) over which a PDCCH candidate (e.g., an identical PDCCH and/or DCI content) may be repeatedly transmitted.

An issue/problem that may be resolved is, at least for such PDCCH repetitions being configured to the WTRU, if allowed in SBFD slot/symbol(s), at least one linked PDCCH candidate (of the at least two linked PDCCH candidates associated with the search space set based on the parameter, e.g., 'searchSpaceLinking') collides (e.g., in a time-domain) with a UL transmission in the SBFD slot/symbol(s).

In one or more cases, when a WTRU is configured with (and monitors) two linked PDCCH candidates (e.g., at least via TDM), if the WTRU determines at least one of them is overlapped (for at least one symbol) with a (scheduled/configured/indicated) UL Tx in SBFD symbol(s), one or more of following may apply.

For instance, the condition for determining whether it is overlapped or not may be based on either when an actual UL TX is scheduled, and/or when a UL subband (SBFD configuration) is given and at least partially overlapped with the DL. The WTRU may be configured (or indicated) to apply either a first behavior for the condition based on when an actual UL TX is scheduled, and/or a second behavior for the condition based on when a UL subband (SBFD configuration) is given and at least partially overlapped with the DL (e.g., regardless of an actual UL Tx being scheduled and/or not).

In example 1 (e.g., operation mode 1), the WTRU may drop receiving both the at least two linked PDCCH candidates of the PDCCH repetition, and the WTRU may, instead, perform the UL transmission (if it is actually scheduled). This may provide benefits in terms of low WTRU complexity and simplified operational behaviors in the communication system employing the SBFD operation.

A WTRU may be configured for selective reception. In an example 2 (e.g., operation mode 2), the WTRU may receive one or more not-overlapped PDCCH candidate(s) (of the at least two linked PDCCH candidates), e.g., if no overlaps at all are found/determined in the time domain, and/or if up to Z symbols are overlapped in which the value of Z>0 may be pre-defined and/or pre-configured and/or indicated. The WTRU may drop receiving other PDCCH candidate(s) of the at least two linked PDCCH candidates being overlapped, and the WTRU may, instead, perform the UL transmission on the overlapped symbol(s). This may improve system throughput and operational efficiency/flexibility as this allows both DL and UL links to be used, at least with the not-overlapped symbol(s) being able to be received as a part of the PDCCH repetition.

A WTRU may be configured for selective reception based on a TCI state. In an example 2A (e.g., operation mode 2A), the WTRU may receive one or more PDCCH candidate(s) (of the PDCCH repetition) being overlapped with the UL but a TCI (e.g., beam and/or time/frequency-domain channel large-scale property(es)/quasi-co-location(QCL)-type(s)) configured and/or indicated for the UL and DL being identical (or associated in a same set of TCIs), in which the WTRU may report its capability for such simultaneous Rx (e.g., as a part of the PDCCH repetition) and Tx (of the UL). The WTRU may report such a capability based on its supported/implemented capability for full-duplex operation (for the simultaneous Tx and Rx) at the WTRU.

A WTRU may be configured for selective reception based on UL-panels. In an example, the WTRU may receive one or more PDCCH candidate(s) (of the PDCCH repetition) being overlapped with the UL but a first WTRU-panel to be used for the Tx and a second WTRU-panel to be used for the DL, in which the WTRU may report its capability for such simultaneous Rx (e.g., as a part of the PDCCH repetition) and Tx (of the UL) over at least two different WTRU-panel (or antenna group and/or different Tx/Rx (hardware) entities, etc.). The WTRU may report such a capability based on its supported/implemented capability for full-duplex operation (for the simultaneous Tx and Rx) at the WTRU.

In one or more cases, if the WTRU determines that all linked PDCCH candidates of the PDCCH repetition are overlapped with the UL, the WTRU may conditionally, in response to the determining, perform the example 1 (operation mode 1) as a fallback behavior.

In example 3, (e.g., operation mode 3), the WTRU may drop performing the UL transmission and monitors all the linked PDCCH candidates. This may provide benefits in that DL control channel (via the PDCCH repetition) may be protected with a high priority.

In one or more cases, a WTRU may be configured for PDSCH repetition. A WTRU may be configured to perform DL receptions based on PDSCH repetition, in which the PDSCH repetition may be time-domain-multiplexed (TDMed) and/or frequency-domain-multiplexed (FDMed) repetitions, based on a higher-layer configure parameter, e.g., 'repetitionNumber' indicating the number of repetitions (e.g., of a same PDSCH content/packet and/or of the PDSCH transport block). In an example, the WTRU may be configured with the parameter (e.g., 'repetitionNumber') that may be in a codepoint (or field state) of a time-domain-resource-assignment (TDRA) field in a DL-DCI (e.g., DCI format 1_1 and/or 1_2, etc.). The WTRU may be configured with a higher-layer configure parameter, e.g., 'repetitionScheme' indicating/selection one DL mTRP Tx scheme among 'fdmSchemeA' (or 'fdmSchemeB') for a frequency-domain-based repetition scheme, 'tdmSchemeA' for a time-domain-based repetition scheme.

An issue/problem that may be resolved is, at least for such PDSCH repetitions being configured to the WTRU, if allowed in SBFD slot/symbol(s), a part of the PDSCH repetition-based occasions collides (e.g., in a time-domain) with a UL transmission in the SBFD slot/symbol(s).

In one or more cases, when a WTRU is configured with two and/or more PDSCH Tx occasions of the same TB (e.g., either multi-slot-level PDSCH and/or intra-slot-level PDSCH), the WTRU may (be configured to) determine whether each PDSCH Tx occasion has at least one symbol-level overlap and/or not with a (scheduled/configured/indicated) UL Tx in SBFD symbol(s). One or more of the following may apply. The condition for determining whether it is overlapped and/or not may be based on either when an actual UL TX is scheduled, and/or when a UL subband (SBFD configuration) is given and at least partially overlapped with the DL. The WTRU may be configured (or indicated) to apply either a first behavior for the condition based on when an actual UL TX is scheduled, and/or a second behavior for the condition based on when a UL subband (SBFD configuration) is given and at least partially overlapped with the DL (e.g., regardless of an actual UL Tx being scheduled and/or not).

In example 1 (e.g., operation mode 1), the WTRU may drop receiving all the scheduled/configured/indicated two and/or more PDSCH Tx occasions, and the WTRU may, instead, perform the UL transmission (if it is actually scheduled). This may provide benefits in terms of low WTRU complexity and simplified operational behaviors in the communication system employing the SBFD operation.

In one or more cases, a WTRU may be configured for selective reception. In an example 2 (e.g., operation mode 2), the WTRU may receive one or more not-overlapped PDSCH Tx occasions (of the scheduled/configured/indicated two and/or more PDSCH Tx occasions), (e.g., if no overlaps at all are found/determined in the time domain, and/or if up to A symbols are overlapped in which the value of A>0 may be pre-defined and/or pre-configured and/or indicated). The WTRU may drop receiving other PDSCH Tx occasions being overlapped, and the WTRU may, instead, perform the UL transmission on the overlapped symbol(s). This may improve system throughput and operational efficiency/flexibility as this allows both DL and UL links to be used, at least with the not-overlapped symbol(s) being able to be received as a part of the PDSCH repetition. One or more of the following may apply. That is, the WTRU may be configured for selective reception based on a TCI state. Further, the WTRU may be configured for selective reception based on a repetition pattern.

For instance, with respect to selective reception based on a TCI state, in an example 2A (e.g., operation mode 2A), the WTRU may receive one or more PDSCH Tx occasion(s) (of the PDSCH repetition) being overlapped with the UL but a TCI (e.g., beam and/or time/frequency-domain channel large-scale property(es)/quasi-co-location(QCL)-type(s)) configured and/or indicated for the UL and DL being identical (or associated in a same set of TCIs), in which the WTRU may report its capability for such simultaneous Rx (e.g., as a part of the PDSCH repetition) and Tx (of the UL). The WTRU may report such a capability based on its supported/implemented capability for full-duplex operation (for the simultaneous Tx and Rx) at the WTRU. In an example, the WTRU may receive one or more PDSCH Tx occasion(s) (of the PDSCH repetition) being overlapped with the UL but a first WTRU-panel to be used for the Tx and a second UL-panel to be used for the DL, in which the WTRU may report its capability for such simultaneous Rx (e.g., as a part of the PDSCH repetition) and Tx (of the UL) over at least two different WTRU-panel (or antenna group and/or different Tx/Rx (hardware) entities, etc.). The WTRU may report such a capability based on its supported/implemented capability for full-duplex operation (for the simultaneous Tx and Rx) at the WTRU.

For instance, with respect to selective reception based on a repetition pattern, in an example 2B (e.g., operation mode 2B), the WTRU may receive one or more PDSCH Tx occasion(s) (of the PDSCH repetition) being indicated with the same (or a pre-defined and/or pre-configured pattern of) TCI (or DL-TCI) based on a configured repetition pattern (e.g., a 'cyclicMapping' and/or 'sequentialMapping') and being not overlapped with UL, e.g., if no overlaps at all are found/determined in the time domain, and/or if up to A symbols are overlapped in which the value of A>0 may be pre-defined and/or pre-configured and/or indicated. The 'cyclicMapping' pattern may imply a first PDSCH Tx occasion to be received with a first TCI and a second PDSCH Tx occasion to be received with a second TCI, and the pattern for these two PDSCH Tx occasions are to be repeated until the last PDSCH Tx occasion being reached. The 'sequentialMapping' pattern may imply a first PDSCH Tx occasion to be received with a first TCI, a second PDSCH Tx occasion to be received with the first TCI, a third PDSCH Tx occasion to be received with a second TCI, a fourth PDSCH Tx occasion to be received with the second TCI, and the pattern for these four PDSCH Tx occasions are to be repeated until the last PDSCH Tx occasion being reached. The WTRU may drop receiving other PDSCH Tx occasion(s) of the PDSCH repetition being overlapped, and the WTRU may, instead, perform the UL transmission on the overlapped symbol(s). This may improve system throughput and operational efficiency/flexibility as this allows both DL and UL links to be used, at least with the not-overlapped symbol(s) being able to be received as a part of the PDSCH repetition.

In one or more cases, a WTRU may be configured for alternative FDRA configurations. For example, The WTRU may (be configured to) use a different frequency-domain-resource-allocation to receive one or more PDSCH Tx occasions, if such overlap to UL is detected, identified, and/or determined at the WTRU, instead of dropping the reception. For this purpose, the WTRU may receive a configuration/indication of the different frequency-domain-resource-allocation (e.g., a set of PRBs) to be used for the reception.

In one or more cases, if the WTRU determines that all PDSCH Tx occasions (of the scheduled/configured/indicated two and/or more PDSCH Tx occasions) of the PDSCH repetition are overlapped with the UL, the WTRU may conditionally, in response to the determining, perform the Example 1 (operation mode 1) as a fallback behavior.

In example 3 (e.g., operation mode 3), the WTRU may drop performing the UL transmission and monitors all PDSCH Tx occasions (of the scheduled/configured/indicated two and/or more PDSCH Tx occasions) of the PDSCH repetition. This may provide benefits in that DL throughput performance may be improved based on setting a DL Rx with a higher priority compared with a UL Tx.

In one or more cases, the disclosure provided herein may relate to devices, methods, and systems for uplink and downlink resource allocations in SBFD symbols, including explicit and implicit indication of resource allocations in addition to reliability issues. In one or more cases, devices, methods, and systems for resource allocations may relate to On Uplink Resource Allocations in SBFD symbols; On Downlink Resource Allocations in SBFD symbols; Explicit Indication of Resource Allocations in SBFD symbols; Implicit Indication of Resource Allocations in SBFD symbols; and On Reliability of Resource Allocations in SBFD symbols. Further, the disclosure provided herein may relate to devices, methods, and systems for repetition enhancements in SBFD symbols, including symbols availability for UL Tx and UL/DL repetition transmission in Multi-TRP and MIMO systems. In one or more cases, devices, methods, and systems for repetition enhancements in SBFD symbols may relate to ON symbols availability for UL Tx; and UL/DL repetition transmission in Multi-TRP and MIMO. In one or more cases, UL/DL repetition transmission in Multi-TRP and MIMO may include solutions on PUCCH repetition, solutions on PUSCH repetition, solutions on PDCCH repetition, solutions on PDSCH repetition.

Figure 6:
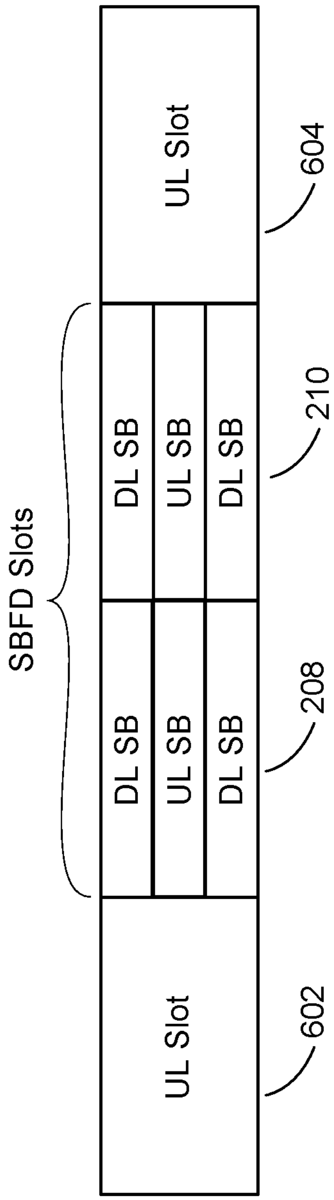
FIG. 6 is another example of a SBFD.

Turning to FIG. 6, another example of SBFD slots is illustrated. Whereas in FIG. 2, SBFD slots 208,210 are surrounded by DL slot 206 on the left and flexible slot 212 and UL slot 214 on the right, in FIG. 7 SBFD slots 208,210 have UL slot 602 and UL slot 604 on the left and right sides, respectively. Any arrangement or pattern of UL, DL, flexible, SBFD, special time instance, or other slots is envisioned in this disclosure. The arrangement of the slots may affect the K1 values and periodicity that are chosen. The arrangement of the slots may also affect the configuration (e.g., subbands, frequency) of PUSCH repetitions.

Additional solutions, implemented in conjunction with any and/or all portions of this disclosure, are described herein. From the WTRU perspective, a WTRU in a cell may be informed of a mixed D/U regions (e.g., slots) across RBs per symbol/slot, where the granularity of a subband is at least a group of RBs or a BWP-level. For the case of BWP-level SBFD, a subband indication for the SBFD operations may be based on reusing an existing BWP indicator in a DCI. Or, alternatively, the BWP indication can be interpreted as muted RBs/BWP region in terms of DL reception or UL transmission to be rate-matched around the muted RBs, as a simplified SBFD operation.

In case the WTRU has detected timing discrepancies (e.g., interference caused due to timing misalignment in UL transmission in SBFD UL subbands, a portion of a UL transmission intended for a SBFD UL subband is in a DL reception subband, etc.), the WTRU may report the issues along with requesting for adjustment or determine which overlapped portion of either DL symbol(s) or UL symbol(s) can be dropped or punctured. For example, the WTRU may also determine to include the time required for the timing alignment inside respective UL/DL SB in SBFD slot, where the scheduled UL transmission on the SBFD slot may have a rate-matched or punctured symbol(s) in the front symbol positions of the UL transmission, or alternatively DL symbol(s) may be punctured, which may depend on gNB's flexible configurations for such WTRU behaviors.

In some cases, the WTRU may drop a UL transmission or DL reception that spans over DL or UL subbands, respectively. A DL/UL channel/signal overlapping with RBs outside DL/UL subbands, respectively, in a SBFD slot or a non-SBFD slot may dropped or postponed.

A wireless transmit/receive unit (WTRU) may receive subband non-overlapping full duplex (SBFD) configuration information. The SBFD configuration information may indicate one or more orthogonal frequency division multiplexing (OFDM) symbols that are associated with one or more subbands for uplink transmission and one or more subbands for downlink reception. The WTRU may receive scheduling information associated with a plurality of physical uplink shared channel (PUSCH) transmissions. The scheduling information may comprise a first frequency domain resource allocation (FDRA). The WTRU may transmit a first PUSCH transmission of the plurality of PUSCH transmissions using a first frequency resource determined based on the first FDRA. The WTRU may determine that at least a second PUSCH transmission of the plurality of PUSCH transmissions is to be sent using at least one OFDM symbol of the one or more OFDM symbols. The WTRU may determine, based on the SBFD configuration information and the first FDRA, that the first frequency resource is at least partially included in the one or more subbands for downlink reception for the at least one OFDM symbol. The WTRU may receive one or more of a second FDRA or a frequency offset for the second PUSCH transmission. The WTRU may determine a second frequency resource for transmitting the second PUSCH transmission based on one or more of the second FDRA or the frequency offset. The second frequency resource may be included in the one or more subbands for uplink transmission for the at least one OFDM symbol. The WTRU may transmit the second PUSCH transmission using the second frequency resource.

The WTRU may determine that the first frequency resource is at least partially included in the one or more subbands for uplink transmission. The WTRU may receive the second FDRA or the frequency offset in the scheduling information. The scheduling information may comprise downlink control information. The WTRU may receive the second FDRA or the frequency offset in a medium access control (MAC) control element (CE), a radio resource control (RRC) configuration, or downlink control information. The WTRU may send the first PUSCH transmission using a time division duplex (TDD) configuration.

The WTRU may determine the start of the second PUSCH transmission based on a starting resource block (RB) of the SBFD or a starting RB of the second FDRA. The WTRU may determine the second FDRA from an indication or the SBFD configuration information. The WTRU may determine the second FDRA from the first FDRA by applying the frequency offset. The frequency offset may be a resource block (RB) offset.

The frequency offset may be configured or indicated using a medium access control (MAC) control element (CE) or a downlink control information (DCI). The frequency offset may be included in the indication or the configuration. The SBFD configuration information may indicate PUSCH repetitions or transport block (TB) over multiple slots (TBoMS). The WTRU may determine types of slots for PUSCH transmissions. The types of slots may be SBFD or non-SBFD. The WTRU may determine a number of slots as available. Determining the number of slots as available may comprise one or more of the following: determining non-SBFD uplink transmission slots as available, determining SBFD slots as available only if the second FDRA is within the one or more subbands for uplink transmission.

The WTRU may determine the first FDRA and second FDRA for non-SBFD slots and SBFD slots. The first FDRA and the second FDRA may use frequency resources or physical resource block (PRB) resources. The WTRU may use the first FDRA for non-SBFD slots and the second FDRA for SBFD slots. The WTRU may determine the second frequency resource for transmitting the second PUSCH transmission using the first FDRA and the frequency offset. The WTRU may use separate frequency resources for SBFD slots and non-SBFD slots based on the first FDRA.

Although features and elements are described above in particular combinations, one of ordinary skill in the art will appreciate that each feature and/or element can be used alone and/or in any combination with the other features and elements. In addition, the methods described herein may be implemented in a computer program, software, and/or firmware incorporated in a computer-readable medium for execution by a computer and/or processor. Examples of computer-readable media include electronic signals (transmitted over wired and/or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, and/or any host computer.

What is claimed is:

1. A wireless transmit receive unit (WTRU) comprising:

a processor configured to:

receive physical uplink control channel (PUCCH) configuration information;

receive subband non-overlapping full duplex (SBFD) configuration information, the SBFD configuration information indicating one or more orthogonal frequency division multiplexing (OFDM) symbols that are associated with a set of one or more subbands for uplink transmission and a set of one or more subbands for downlink reception;

receive downlink control information (DCI) comprising a first PUCCH resource indicator (PRI);

determine that a PUCCH transmission indicated by the DCI is to be sent using at least one of the one or more OFDM symbols that are associated with the set of one or more subbands for uplink transmission and the set of one or more subbands for downlink reception indicated by the SBFD configuration information;

determine, based on a first rule of interpreting the first PRI and the PUCCH configuration information, that a first PUCCH resource indicated by the first PRI is included in at least one frequency resource that is at least partially included in at least one subband of the set of one or more subbands for uplink transmission and one subband of the set of one or more subbands for downlink reception indicated by the SBFD configuration information;

determine a second PUCCH resource in response to the determination that the first PUCCH resource indicated by the first PRI is included in at least one frequency resource that is at least partially included in at least one subband of the set of one or more subbands for uplink transmission and one subband of the set of one or more subbands for downlink reception indicated by the SBFD configuration information, wherein the second PUCCH resource is determined based on a second rule for interpreting the first PRI and the PUCCH configuration information, the second PUCCH resource being within the set of one or more subbands for uplink transmission indicated by the SBFD configuration information, and wherein the second rule maps the first PRI to a second PRI, wherein the second PRI is used for determining the second PUCCH resource, wherein the second PRI is used for SBFD uplink transmissions based on an association with non-SBFD PRIs; and transmit the PUCCH transmission using the second PUCCH resource.

2. The WTRU of claim 1, wherein the second rule comprises applying a frequency offset to the first PUCCH resource.

3. The WTRU of claim 1, wherein the second rule comprises applying a different mapping for the first PRI to PUCCH resources for transmissions associated with the SFBD configuration information and the first PRI.

4. The WTRU of claim 1, wherein the second PUCCH resource is in slot symbols.

5. The WTRU of claim 1, wherein the PUCCH configuration information comprises a number of transmission repetitions.

6. The WTRU of claim 1, wherein the processor is configured to transmit the PUCCH transmission using a frequency domain resource allocation (FDRA).

7. The WTRU of claim 1, wherein the DCI indicates that the first PRI is for HARQ-ACK transmission.

8. The WTRU of claim 1, wherein the determination of the second PUCCH resource comprises re-indexing PUCCH resources.

9. The WTRU of claim 1, wherein the transmission of the PUCCH transmission is in time units configured for SBFD.

10. A method implemented by a wireless transmit receive unit (WTRU), the method comprising:

receiving physical uplink control channel (PUCCH) configuration information;

receiving subband non-overlapping full duplex (SBFD) configuration information, the SBFD configuration information indicating one or more orthogonal frequency division multiplexing (OFDM) symbols that are associated with a set of one or more subbands for uplink transmission and a set of one or more subbands for downlink reception;

receiving downlink control information (DCI) comprising a first PUCCH resource indicator (PRI);

determining that a PUCCH transmission indicated by the DCI is to be sent using at least one of the one or more OFDM symbols that are associated with the set of one or more subbands for uplink transmission and the set of one or more subbands for downlink reception indicated by the SBFD configuration information;

determining, based on a first rule of interpreting the first PRI and the PUCCH configuration information, that a first PUCCH resource indicated by the first PRI is included in at least one frequency resource that is at least partially included in at least one subband of the set of one or more subbands for uplink transmission and one subband of the set of one or more subbands for downlink reception indicated by the SBFD configuration information;

determining a second PUCCH resource in response to the determination that the first PUCCH resource indicated by the first PRI is included in at least one frequency resource that is at least partially included in at least one subband of the set of one or more subbands for uplink transmission and one subband of the set of one or more subbands for downlink reception indicated by the SBFD configuration information, wherein the second PUCCH resource is determined based on a second rule for interpreting the first PRI and the PUCCH configuration information, the second PUCCH resource being within the set of one or more subbands for uplink transmission indicated by the SBFD configuration information, and wherein the second rule maps the first PRI to a second PRI, wherein the second PRI is used for determining the second PUCCH resource, wherein the second PRI is used for SBFD uplink transmissions based on an association with non-SBFD PRIs; and transmitting the PUCCH transmission using the second PUCCH resource.

11. The method of claim 10, wherein the second rule comprises applying a frequency offset to the first PUCCH resource.

12. The method of claim 10, wherein the second rule comprises applying a different mapping for the first PRI to PUCCH resources for transmissions associated with the SFBD configuration information and the first PRI.

13. The method of claim 10, wherein the second PUCCH resource is in slot symbols.

14. The method of claim 10, wherein the PUCCH configuration information comprises a number of transmission repetitions.

15. The method of claim 10, wherein the PUCCH transmission is transmitted using a frequency domain resource allocation (FDRA).

16. The method of claim 10, wherein the DCI indicates that the first PRI is for HARQ-ACK transmission.

17. The method of claim 10, wherein determining the second PUCCH resource comprises re-indexing PUCCH resources.

18. The method of claim 10, wherein transmitting the PUCCH transmission is in time units configured for SBFD.

* * * * *